United States Patent [19]

Omitsu

[11] Patent Number: 4,580,465

[45] Date of Patent: Apr. 8, 1986

[54] MICROPROCESSOR CONTROLLED SYSTEM AND METHOD FOR REDUCING THE FUEL FLOW TO THE PRIME MOVER OF A POWER DELIVERY SYSTEM HAVING A CONTINUOUSLY VARIABLE RATIO TRANSMISSION UPON A COMMANDED DECREASE IN POWER DELIVERY

[75] Inventor: Takashi Omitsu, Madison, Wis.

[73] Assignee: Aisin Seiki Kabushiki Kaisha, Japan

[21] Appl. No.: 581,292

[22] Filed: Feb. 24, 1984

[51] Int. Cl.$^4$ .................... B60K 41/18; B60K 41/12
[52] U.S. Cl. .................................. 74/866; 74/859; 74/872
[58] Field of Search ............... 74/878, 877, 872, 870, 74/866, 860, 859; 123/333, 332, 179 G

[56] References Cited

U.S. PATENT DOCUMENTS

| | | | |
|---|---|---|---|
| Re. 24,347 | 6/1955 | Miner | 74/230.17 F |
| 2,131,157 | 9/1938 | Almen et al. | 74/472 |
| 3,008,341 | 11/1961 | Cobb | 74/472 |
| 3,044,316 | 7/1962 | Forster | 74/472 |
| 3,256,747 | 6/1966 | Kempson | 74/472 |
| 3,368,426 | 2/1968 | Karig et al. | 74/865 |
| 3,552,232 | 1/1971 | Kress | 74/689 |
| 3,616,706 | 11/1971 | Shimamoto | 74/230.17 |
| 3,866,584 | 2/1975 | Bigalke et al. | 123/333 |
| 4,008,567 | 2/1977 | Hirsch | 60/39.28 P |
| 4,023,442 | 5/1977 | Woods et al. | 74/863 |
| 4,091,690 | 5/1978 | Miyao | 74/865 |
| 4,107,776 | 8/1978 | Beale | 364/431 |
| 4,152,947 | 5/1979 | Van Deursen et al. | 74/230.17 F |
| 4,161,894 | 7/1979 | Giacosa | 74/863 |
| 4,220,059 | 9/1980 | Mizuno et al. | 74/865 |
| 4,229,998 | 10/1980 | Mizuno et al. | 74/865 |
| 4,241,618 | 12/1980 | Smirl | 74/863 |
| 4,246,807 | 1/1981 | Kofink | 74/872 |
| 4,253,347 | 3/1981 | Mizuno et al. | 74/862 |
| 4,281,567 | 8/1981 | Maurer | 74/866 |
| 4,368,653 | 1/1983 | Mizuno et al. | 74/868 |
| 4,371,050 | 1/1983 | Ikeura | 180/271 |
| 4,381,684 | 5/1983 | Himmelstein | 74/862 |
| 4,383,456 | 5/1983 | Ganoung | 74/866 |
| 4,389,910 | 6/1983 | Lockhart | 74/843 |
| 4,428,257 | 1/1984 | Meyerle et al. | 74/866 |
| 4,434,759 | 3/1984 | Iezuka et al. | 123/333 X |
| 4,438,664 | 3/1984 | Fiala | 74/866 |
| 4,445,603 | 5/1984 | Filsinger | 192/0.055 |
| 4,458,560 | 7/1984 | Frank et al. | 74/857 |
| 4,463,629 | 8/1984 | Himmelstein | 74/866 X |
| 4,483,341 | 1/1984 | Hassler et al. | 123/350 |

FOREIGN PATENT DOCUMENTS

| | | | |
|---|---|---|---|
| 0072561 | 2/1983 | European Pat. Off. | 123/332 |
| 0028568 | 2/1983 | Japan | 123/333 |

OTHER PUBLICATIONS

Stubbs, "The Development of a Perbury Traction Transmission for Motor Car Applications", *American Society of Mechanical Engineers*, (1980).

(List continued on next page.)

*Primary Examiner*—William F. Pate, III
*Assistant Examiner*—D. Wright
*Attorney, Agent, or Firm*—Banner, Birch, McKie & Beckett

[57] ABSTRACT

A control system and method for a power delivery system, such as in an automotive vehicle, having an engine coupled to a continuously variable ratio transmission (CVT). Totally independent control of engine and transmission enable the engine to precisely follow a desired operating characteristic, such as the ideal operating line for low fuel consumption. CVT ratio is controlled as a function of commanded desired system performance (e.g., power or torque) and measured actual system performance, such as CVT torque output, while engine fuel requirements (e.g., throttle position) are strictly a function of measured engine speed. Fuel requirements are therefore precisely adjusted in accordance with the ideal characteristics for any load placed on the engine. Appropriate controls prevent anomalous engine and vehicle behavior, and allow for transient start-up from rest. In order to counteract the inherent tendency of the vehicle to accelerate when the accelerator pedal is released, a microprocessor is provided for decreasing the fuel flow to the system prime mover upon a commanded decrease in power delivery.

21 Claims, 20 Drawing Figures

OTHER PUBLICATIONS

Ironside et al., "Continuously Variable Transmission Control", *Vehicular Technology Society IEEE*, (1980).

Beachley et al., "Principles and Definitions for Continuously Variable Transmissions, with Emphasis on Automotive Applications", *American Society of Mechanical Engineers*, (1980).

"Porsche Features Engine and Driveline Efficiency", *Automotive Engineering*, vol. 90, No. 1, Jan. 1982, pp. 38–48.

Rayward et al., "Design Study of Torodial Traction CVT for Electric Vehicles" (1980).

Oliver et al., "Design Equations for a Speed and Torque Controlled Variable Ratio V-Belt Transmission", *Society of Automobile Engineers*, (1973).

SHEAVE ACTUATING CURVES

MICROPROCESSOR CONTROLLED SYSTEM AND METHOD FOR REDUCING THE FUEL FLOW TO THE PRIME MOVER OF A POWER DELIVERY SYSTEM HAVING A CONTINUOUSLY VARIABLE RATIO TRANSMISSION UPON A COMMANDED DECREASE IN POWER DELIVERY

BACKGROUND OF THE INVENTION

This invention relates to a power delivery system having a continuously variable ratio transmission such as might be used in an automotive vehicle and, more particularly, to a microprocessor controlled system and control method for reducing the fuel flow to the system prime mover upon a commanded decrease in power delivery. The present invention represents an improvement in the control system disclosed in pending and commonly assigned application Ser. Nos. 380,922 and 380,923 filed May 21, 1982 and which are incorporated herein by reference.

The quest for greater fuel economy of automotive vehicles has led to significant improvements in engine and transmission design and control. Continuously variable ratio transmissions (CVT) have shown particular promise in this regard. It will be appreciated that at any given vehicle speed, and for any needed propulsive force, a certain transmission ratio will provide maximum fuel economy for a given engine. In addition, for any given vehicle speed, one transmission ratio will permit maximum acceleration with that engine. Since a CVT with the proper ratio range can provide any desired transmission ratio, it is obviously attractive for automobiles from the standpoint of economy, low emissions and performance. If the mechanical efficiency of the CVT is high and its ratio range is wide enough, it can even be possible to have both maximum economy and maximum performance in the same vehicle. Among the obvious benefits are fully automatic operation, smooth, stepless and rapid response to driver demand and quieter cruising.

Many different CVT configurations have been developed in the prior art. These include, for example, hydrostatic transmissions; rolling contact traction drives; overrunning clutch designs; electrics; multi-speed gear boxes with slipping clutch; and V-belt traction drives. Of these the V-belt traction drives appear attractive for small to medium size passenger car applications because of their compactness, lightness and simplicity of design. Basically, this type of CVT comprises a V-belt which interconnects a driver sheave and a driven sheave, the diameters of the sheaves being variable to change the ratio of the CVT. Recent advances in belt design have resulted in improved belt durability and longevity. If sheave movement can be properly controlled so as to avoid undue stresses on the belt, it is expected that a very long belt life can be achieved.

Many control schemes have been devised for engine-CVT systems in attempts to maximize fuel economy. These have been based on empirical analyses of individual engine performance, and the realization that, for any desired power output, there is an optimum combination of engine speed and torque which will result in minimum fuel consumption. This is illustrated in FIG. 1.

FIG. 1 is a typical performance map of a four cylinder spark ignition passenger car engine having a displacement of approximately 2.5 liters. The map is a plot of engine torque $T_E$ and brake horsepower $B_{HP}$ as a function of engine speed $N_E$. The dot-dash line near the top of the map is a plot of engine torque at full throttle. The series of curves in solid black lines are fuel consumption contours, indicating constant brake specific fuel consumption (BSFC) IN 1 b.M/BHP-hr. Minimum fuel consumption occurs at a point designed by 0.4 pounds per horsepower-hour. The series of dashed lines indicates power output of the engine. The ideal operating line for low fuel consumption is indicated by the heavy solid line $f(N_E)$, this curve being a function of engine speed. The ideal operating line for low fuel consumption is purely a function of engine characteristics and is optimal regardless of vehicle road speed. Other ideal operating lines may appear on the performance map, for example, the ideal operating line for low emissions.

In a vehicle with a conventional, manually shifted gearbox, forward speed ratios usually are available in only four or five steps. The operating point of the engine on the performance map is determined by drive shaft speed, power or torque commanded, and transmission gear ratio. Since there are only a few gear ratios available in a typical transmission, the engine must be throttled much of the time. The engine must therefore operate most of the time at high BSFC values. In contrast, a CVT is able to vary its speed ratio continuously to allow the engine to run at wider throttle and lower BSFC values.

Perhaps the most difficult task demanded of a control system for an engine-CVT system is to maintain engine operation along the ideal operating line. This is due to the almost continuous transient nature of operation of an automotive vehicle, there being hardly ever a time when road load and commanded torque or power remain constant. Transient conditions usually are dealt with by a change in CVT ratio, engine speed and throttle. Prior art control systems, by their very nature, permit an excursion of engine operation away from the ideal operating line before returning back to it at steady state. An example of such an excursion is shown in FIG. 1 by dashed line X-Y-Z. The result is that engine operation approaches, but hardly ever is maintained on the ideal operating line. Two such prior art systems are illustrated in FIGS. 2 and 3.

FIG. 2 schematically illustrates a system devised by Peter Stubbs for British Leyland. This system is described in greater detail in Stubbs, *The Development of a Perbury Traction Transmission for Motor Car Applications*, ASME Publication No. 80-C2/DET-59 (August, 1980). In this system, engine speed, throttle position and CVT ratio signals are all fed to a computer controller which has, in its memory, the engine operating characteristics for minimum fuel consumption. The computer controller generates, as a function of these variables, an engine control signal for adjusting the position of the throttle, and a ratio rate signal which changes the ratio of the CVT. The throttle is under the direct control of the vehicle accelerator pedal so that, while the engine control signal may vary the throttle position somewhat from that commanded by the driver, the throttle position still is primarily a function of commanded power or torque.

FIG. 3 is a schematic representation of the system devised by Miyao for Aisin Seiki. This system is described in greater detail in U.S. Pat. No. 4,091,690. Here, as in the Stubbs system, engine throttle is primarily a function of commanded power or torque by direct connection with the accelerator pedal. The computer generates a ratio rate signal to change the CVT ratio as a function of measured throttle position and engine torque and speed. Inherently sensed output torque also affects the CVT ratio.

In these, as well as in virtually all other engine-CVT control systems, throttle position is controlled directly by the vehicle accelerator pedal, or is a direct function of pedal position, as well as other parameters. Engine and transmission control usually are directly related to one another. Such control schemes permit engine operation during transients to vary from the ideal operating line. Excursions away from the ideal operating line result in less than optimum engine operation (e.g., excessive fuel consumption, or excessive emissions), until effective control is resumed by the system during steady state operation. As pointed out earlier, however, most vehicular operation is transient in nature, rather than steady state, so that substantially all engine operation occurs off the ideal operating line. Emissions calibrations must therefore be made in a substantial portion of the engine performance map. Most prior art control systems also must be specifically tailored to particular engines. This requires numerous specially designed control systems for a fleet of differently powered vehicles. In addition, most prior art control systems cannot compensate for varying engine conditions, the result being vehicle drivability which varies with engine temperature, state of tune, age and alititude. Close duplication of conventional vehicle characteristics also is a problem with prior art CVT control schemes.

The above noted disadvantages and deficiencies of prior art CVT control schemes were overcome by the control system and method disclosed in the pending prior applications mentioned above. These application disclose that engine operation can readily be maintained along the ideal operating line by providing for totally independent engine and transmission control. That is, the position of the engine throttle is totally independently of accelerator pedal position. Throttle position and, hence, engine output torque simply is a function of engine speed only, and that function may be any desired relationship, for example, the ideal operating line for low fuel consumption, the ideal operating line for low emissions, or a compromise ideal operating line for low fuel consumption and low emissions. Torque, power or other desired performance parameters commanded by the accelerator pedal controls CVT ratio, and engine speed is determined by the load placed thereon, which is a function of road load and CVT ratio. Hence, throttle position is precisely adjusted in accordance with the ideal function for any load placed on the engine. With the control system and method disclosed in the prior applications, anomalous engine and vehicle behavior, such as engine overspeed and underspeed conditions, can be prevented, transient start-up from rest can be accommodated, and the vehicle can be made to perform almost in all respects just as a vehicle with a conventional automatic transmission.

For convenience, the control system and method disclosed in the prior applications and the improvement therein provided by the present invention, are described throughout this specification in the context of an engine-CVT propulsion system for an automotive vehicle. It should be understood, however, that the principles disclosed are equally applicable to any type of power delivery system, including but not limited to other vehicular systems using internal or external combustion engines of any design, or to stationary power plants for driving compressors, generators or any other type of machinery. Where the term "throttle" is used, the term is understood to encompass any mechanism for controlling the delivery of fuel to the engine or other prime mover, be it a conventional carbureted spark-ignition engine wherein fuel flow varies with throttle butterfly position, a fuel injected spark-ignition or diesel engine, a gas turbine, and so on.

Referring to FIGS. 4–11, the control system disclosed in the pending prior applications will now be discussed. FIG. 4 illustrates the functional relationship of the components used to implement the control system. An engine 10 is drivingly coupled to a continuously variable ratio transmission (CVT) 14 through a clutch or fluid coupling (not shown). Fuel is fed to engine 10 by a fuel delivery means 12, which may be the throttle and fuel jets of a conventional carburetor, a fuel injection system or the like. CVT 14 may be one of the many types of continuously variable ratio transmissions discussed above. Output shaft 16 delivers power and torque from the engine and CVT. The ratio of the CVT is set by a CVT ratio controller 17, which generates a rate of change of ratio signal kR as a function of output torque $T_O$ measured by torque sensor 19 and commanded power or torque commanded by accelerator pedal 18. Other parameters indicative of engine-CVT system performance may be used by ratio controller 17 to effect a change of CVT ratio in a similar manner. For example, rather than using desired output power or torque and measured actual output torque, commanded and measured vehicle acceleration, output shaft accelerator, or other parameters could be used. In the control system shown in FIG. 4, however, CVT ratio is strictly a function of commanded power or torque and measured output torque, and is completely independent of engine operation. Engine control, on the other hand, is provided by an engine controller 100 which adjusts fuel delivery means 12 in accordance with measured engine speed $N_E$. This relationship may desirably be the ideal engine operating line for low fuel consumption, the ideal operating line for low emissions, a compromise of the two, or any other desired engine operating characteristics.

FIG. 5 schematically illustrates the entire control system in greater detail. The particular type of CVT illustrated in FIG. 5 is the variable diameter pulley, V-belt traction drive type having a driven sheave 20 connected to output shaft 16 and a driver sheave 30 which is coupled to engine 10. Belt 15 interconnects sheaves 20 and 30 to transmit motive power therebetween. Sheaves 20 and 30 are hydraulically actuated by pressurized fluid to vary the driving diameters. Sheave 20 has an axially fixed portion 22 and an axially movable portion 24. Pressurized fluid in a fluid chamber 26 behind movable portion 24 provides the axial force required to maintain portions 22 and 24 at a fixed distance from one another (i.e., to hold the driving diameter of sheave 20 constant), and to move portion 24 toward or away from portion 22 to vary the driving diameter. Similarly, sheave 30 has an axially fixed portion 32 and a movable portion 34 which is under the influence of fluid pressure in chamber 36. Proper pressures in chambers 26 and 36 to keep belt 15 under proper tension are maintained by the control system, as described below.

The position of throttle (fuel delivery means) 12 is controlled by a throttle servo 13 which receives signals from engine control circuit 100. During certain transient operations (described below) fuel delivery may be diminished by a fuel diminishing valve 11, or fuel delivery may be suspended completely by a fuel suspension mechanism 9. The fuel diminishing and suspension functions may be performed, for example, by a single solenoid valve operable in variable modes. Engine control circuit 100 is responsive to inputs from the accelerator pedal ($\alpha$), engine speed ($N_E$), a manual override switch which permits operation in the automatic or manual mode, and a start/neutral switch (S/N) which insures that the vehicle will remain stationary when the engine is started.

Fluid pressure for activating the driven sheave is provided by a sheave pressure generator 200 which acts through a pressure servo controller 250 and a fluid distribution circuit 500. Similarly, fluid pressure for activating the driver sheave 30 is provided by sheave pressure generator 300 acting through a servo controller 350 and fluid distribution circuit 500. Pressure generator 200 is responsive to inputs of engine speed $N_E$, accelerator position $\alpha$, drive shaft speed $N_{DS}$ measured by a sensor associated with drive shaft 16, and CVT ratio R. Ratio R is generated by CVT ratio circuit 600 and is the quotient of engine speed NE divided by drive shaft speed NDS.

A starting clutch 40 is provided which couples engine 10 and CVT 14. Clutch 40 is disengaged when the vehicle is stationary, and is partially engaged during slow vehicle operation, gradually approaching full engagement, which occurs as described below at a predetermined point of operation. Starting clutch 40 is controlled by a control circuit 400 which is responsive to accelerator pedal position $\alpha$, engine speed $N_E$ and the auto/manual switch, through servo controller 450 and fluid distribution circuit 500.

FIGS. 7, 8 and 9 schematically illustrate in greater detail the functional relationships of the components illustrated in FIG. 5. FIG. 7 is primarily directed to the engine control circuit 100. A key element of control circuit 100 is function generator 102, which may generate a function representative of any desired engine operating characteristic. For this embodiment the function f(NE) is chosen as the ideal engine operating line for low fuel consumption. $\theta$ represents throttle angle, which is proportional to desired engine output torque. FIG. 1 graphically illustrates this function as f($N_E$). The value of the function produced by generator 102 is fed directly to throttle servo 13 via amplifier 104. In the event the automatic control system is disabled, it is possible to switch to a manual mode through mode switch 106. In the manual mode, accelerator position $\alpha$ is directly communicated to throttle servo 13 via amplifier 104. The start/neutral switch S/N also operates through mode switch 106.

A fuel suspension comparator 108 provides for engine overspeed control, which may tend to occur upon vigorous acceleration or if there is a malfunction in the control system. Comparator 108 compares engine speed $N_E$ to the maximum permissible engine speed, for example, 6000 rpm. If $N_E$ is greater than 6000 rpm, fuel suspension mechanism 9 is activated to suspend delivery of fuel to engine 10. Fuel suspension mechanism 9 may be, for example, a solenoid cutoff valve.

Another engine speed control is provided to counteract the inherent tendency of the vehicle to speed up when the accelerator pedal is released. This phenomenon occurs upon deceleration because the vehicle inertia becomes coupled to the inertia of a relatively unthrottled engine through a transmission whose ratio is changing towards overdrive. This undesirable tendency is even more pronounced when the accelerator pedal is released suddenly and completely. This anomalous behavior is prevented by reducing fuel flow to the engine when pressure on the accelerator pedal is relieved, the reduction of fuel flow being proportional to the rate at which pedal position decreases ($-\dot{\alpha}$), and by reducing fuel flow even further when the accelerator pedal position drops to below 3.6% of full excursion. To accomplish this control, a pulse width modulator 110 controls fuel diminishing valve 11, the duty cycle (i.e., the percentage of the pulse cycle during which fuel diminishing valve is held open) of modulator 110 being inversely proportional to the rate at which pedal position $\alpha$ decreases ($-\dot{\alpha}$). $-\dot{\alpha}$ is derived from a differentiator 112 only if $\dot{\alpha}$ is less than zero. In addition, a fuel diminishing comparator 114 reduces the duty cycle of modulator 110 to or near zero when pedal position $\alpha$ drops to below 3.6%.

FIG. 8 relates primarily to the starting clutch control circuit 400. It will be appreciated that some type of coupling must be provided between the engine and the CVT in order to permit the engine to idle while the vehicle is stationary. A fluid coupling could be used, but the mechanical losses inherent in such a device are antithetical to the desired objective of maximizing fuel economy. A torque converter with a lock-up clutch would be an improvement, but a mechanical clutch is preferred, and one which is hydraulically actuated would be well suited for this purpose. The object here, as in the conventional automobile, is to totally disengage the clutch when the vehicle is stationary, and to gradually engage it to begin vehicle movement and progressively engage the clutch further as the vehicle speed increases. To this end the measured transmission ratio R (which is computed as the quotient of engine speed $N_E$ and drive shaft speed $N_{DS}$ by ratio circuit 600) is fed to a comparator 402. Comparator 402 closes switch 404 when R exceeds 4.7 to deliver the signal from amplifier 406 to throttle servo 13 via amplifier 104. This signal is equal to $\alpha - N_{E'}$, where $N_{E}'$ is a function produced by generator 408 equal to $K(N_E - 1000$ rpm). Thus, the accelerator pedal 18 is coupled directly to throttle 12 in a variable way defined by $\alpha - N_{E}'$. The constant K is selected such that engine speed cannot exceed 2500 rpm if the clutch is not fully engaged. This direct coupling of accelerator pedal to throttle allows an input to be provided to the system to initiate movement of the vehicle from a stationary position.

Comparator 402 also closes switch 410 to transmit pedal position directly to the clutch pressure servo controlled 450. Hence, the degree of engagement of clutch 40 is proportional to pedal position up to the point where ratio R equals 4.7. During this period the degree of direct control of the accelerator pedal over throttle 12 diminishes as engine speed increases in accordance with the above-described relationship.

When ratio R drops below 4.7, switches 404 and 410 open, and comparator 411 closes switch 412 to deliver maximum pressure to the clutch servo controller 450. Maximum pressure causes full engagement of the clutch. As the vehicle accelerates beyond this point, it is under total automatic control.

It can be seen that if no start/neutral S/N switch were provided any depression of accelerator pedal 18 upon startup would cause engagement of clutch 40 and a forward lurch of the vehicle. The S/N switch therefore effectively disables the effect of $\alpha$ on clutch 40 to permit safe startup.

FIG. 9 relates primarily to the sheave pressure generator for the driven sheave 200 and the sheave pressure generator for the driver sheave 300. Pressure generator 200 includes circuitry which engages the transmission ratio to increase the load on the engine if the engine tends to exceed the maximum operating speed of 5500 rpm ($N_{MAX}$). Also provided is circuitry for changing the transmission ratio to decrease the load on the engine should the engine speed tend to decrease below the idle speed of 1000 rpm ($N_{MIN}$). This is accomplished by means of summing amplifiers 230, 232 and clipping circuits 234, 236. Summing amplifier 232 and clipping circuit 236 act to reduce pressure on the driven sheave 200 to increase the load on the engine. Amplifier 232 receives $N_E$, applied to its negative input terminal, and $N_{MAX}$, applied to its positive input terminal, and produces a summed output signal $N_{MAX}-N_E$. This summed output is applied to clipping circuit 236 which is a non-linear device having the characteristic shown in FIG. 9. This device can be, for example, a reverse biased diode which produces a negative substantially linear output for negative excursions of its input signal and a zero output for positive excursions.

Consequently, if $N_E$ exceeds $N_{MAX}$, the input signal applied to circuit 236 will be negative, thereby resulting in a negative output signal. This negative output signal is then applied to summing amplifier 210 to reduce the value of its summed output signal in proportion to the amount $N_E$ exceeds $N_{MAX}$. As a result, the pressure on driven sheave 200 will be proportionally decreased. On the other hand, if $N_E$ is less than $N_{MAX}$, the input signal applied to clipping circuit 236 will be positive resulting in a zero output signal applied to amplifier 210. Such an output signal has no affect on the summed output signal of amplifier 210; thus, no change in the signal supplied to the driven servo-controlled 250 is produced.

Summing amplifier 230 and clipping circuit 234 act to increase pressure on the driven sheave 200 to decrease the load on the engine. Amplifier 230 receives $N_E$, applied to its negative input terminal, and $N_{MIN}$, applied to its positive input terminal, and produces a summed output signal $N_{MIN}-N_E$. This summed output is applied to a clipping circuit 234 similar to circuit 236. Circuit 234, however, has a non-linear transfer characteristics which produces a positive substantially linear output for positive excursions of its input signal and a zero output for negative excursions. Circuit 234 can be, for example, a forward baised diode. If $N_E$ falls below $N_{MIN}$, the input signal applied to clipping circuit 234 will be positive, thereby resulting in a positive output signal. This positive output signal is then applied to summing amplifier 210 to increase the value of its summed output signal in proportion to the amount $N_E$ is less than $N_{MIN}$. As a result, the pressure on driven sheave 200 will be proportionally increased. On the other hand, if $N_E$ is greater than $N_{MIN}$, then a zero output signal will be produced by circuit 234 which has no affect on the summed signal applied to servo-controller 250.

Pressure generator 200 also includes circuitry for adjusting the sensitivity of accelerator pedal 18, depending on vehicle speed, to more closely simulate the "feel" of a conventional vehicle. This is required because of the inherent operating characteristics of the engine and CVT. That is, at higher vehicle speeds, the torque produced by the engine remains fairly high and constant (see FIG. 1). In the conventional vehicle the remaining small percentage of torque which can be extracted from the engine is delivered to the rear wheels through a transmission in high gear with a fixed, very low reduction ratio. Vehicle acceleration is therefore fairly insensitive to accelerator pedal movement at high speeds. In a CVT equipped vehicle, however, depression of the accelerator pedal even at high vehicle speeds results in an increased reduction ratio and an associated multiplication of torque in excess of that provided in the conventional vehicle. Thus, if only direct accelerator pedal position $\alpha$ were used to control CVT ratio at higher speeds, vehicle response would be extremely sensitive to accelerator pedal movement. The sensitivity of the accelerator pedal 18 must therefore be dulled at higher vehicle speeds.

Pedal sensitivity is controlled by two comparators 212, 214. As long as vehicle speed is below a threshold equivalent of drive shaft speed $N_{DS}$ equal to or less than 1173 rpm, switch 216 remains closed to deliver the $\alpha$ signal directly to amplifier 210. This effectively is torque control. When drive shaft speed $N_{DS}$ exceeds 1173 rpm, switch 216 opens and switch 218 is closed so that a pedal position signal equivalent to $\alpha$ divided by $N_{DS}$ (provided by divider 220) is delivered to amplifier 210. This effectively is power control. In this way, the effect of any movement of accelerator pedal 18 in the higher speed ranges is diminished so as to more closely simulate the pedal response of a conventional automobile.

FIG. 10 shows a modification of the sheave pressure generator 200, wherein accelerator sensitivity is controlled as a function of ratio R. Comparator 212' close switch 216' to connect the accelerator pedal position signal $\alpha$ directly to amplifier 210 when ratio R equals or exceeds 3. The comparator 214' closes switch 218' to feed a dulled signal to amplifier 210 from divider 220' when ratio R is below 3.

The control of transmission ratio described above actually is a ratio rate control, $\dot{R}$. That is, the greater the magnitude of the increase (or decrease) in fluid pressure on driven sheave 20 commanded by accelerator pedal 18, the more rapid the change of sheave diameters will be. Thus, for example, a rapid depression of accelerator pedal 18 will result in a rapid change of CVT ratio and quick acceleration. This, of course, closely simulates the characteristics of a conventional vehicle.

The control system disclosed in FIGS. 4–11 involves, in part, the recognition that control of the ratio rate $\dot{R}$ of the CVT, rather than merely the CVT radio, yields improved CVT control. This improved control is explained by reference to the following derived vehicle performance equation:

$$\dot{N}_{DS} = \frac{-\dot{R}I_E N_E}{I_{EQ}} + \frac{RT_E - T_{RL} - T_{loss}}{I_{EQ}}$$

where
$I_{EQ} = I_{CDS} + R^2 I_E$,
R is the ratio rate of the transmission,
R is the ratio of the transmission,
$I_E$ is engine inertia,
$N_E$ is engine speed,
$T_E$ is engine torque,
$T_{RL}$ is road load torque reflected to the drive shaft and includes tires, final drive and axle losses,
$T_{loss}$ is transmission loss, $I_{CDS}$ is car inertia reflected to the drive shaft, and $\dot{N}_{DS}$ is vehicle acceleration measured at the drive shaft.

It is clear that the acceleration of the vehicle $\dot{N}_{DS}$ is dependent primarily upon control of any one or more of these variable such as, for example, $T_E$, R or $\dot{R}$. Generally, conventional vehicle systems vary the transmission ratio R and engine output torque $T_E$ to provide the required transmission and vehicle control. By controlling R, however, it is difficult to constantly maintain engine torque and speed along the ideal operating line. This is due to the fact that each time R is varied, the load on the engine is changed which, in turn, affects the engine's output torque and vehicle acceleration.

Attempts to simultaneously change the engine torque and speed to force engine operation back on the ideal line have necessitated very complex control systems, since control is dependent on several variables of the performance system. For example, these systems must necessarily perform the complicated task of calculating the necessary target throttle position and CVT ratio R to force engine operation back on the ideal line. These systems also require the calculation of ratio rate $\dot{R}$ so that the rate is changing the ratio to the target value does not result in undesirable vehicle dynamics. For example, if $\dot{R}$ is selected to be excessive then an undesirable deceleration of the vehicle will occur before the vehicle can accelerate. This phenomenon results from the negative sign of the $\dot{R}$ term in the above performance equation.

This control system, however, recognizes that $\dot{R}$ can easily be sensed and controlled without causing the other variables to adversely affect engine performance. This is accomplished by separating the engine control from the transmission control so that engine torque and speed are fixed along the ideal engine operating line. As a result of controlling $\dot{R}$ no adverse affect on the other dependent variables occur. In particular, changing $\dot{R}$ along, with its concomitant change on R, will not force engine operation off the ideal operating line since engine speed and torque are determined soley by the fuel function $f(N_E)$. As a result, vehicle acceleration $\dot{N}_{DS}$ and output torque $T_O$ are controlled solely by ratio rate $\dot{R}$, rather than by the other variables of the performance system.

It has been discovered that rate of change of ratio ($\dot{R}$) is closely approximated by the following relationships:

$$k\dot{R} = \alpha - T_O \text{ (for low speeds: torque control)}$$

and $$k\dot{R} = \frac{\alpha}{k'N_{DS}} - T_O \text{ (for high speeds: power control).}$$

In the V-belt traction drive CVT discussed above, the comparison of accelerator pedal position $\alpha$ and output torque $T_O$ occurs inherently in the belt and pulley components to effect a ratio change at a rate $\dot{R}$. Other types of CVTs may require different control elements to effect this relationship. As stated earlier, however, other parameters indicative of system performance may be used to effect a ratio change at a rate $\dot{R}$, where $\dot{R}$ is proportional to the difference between the desired performance parameter and the actual measured performance parameter.

The above described control scheme is graphically illustrated in FIG. 11. FIG. 11 is a plot of engine speed $N_E$ as a function of vehicle speed or drive shaft speed $N_{DS}$. The minimum and maximum CVT ratios are illustrated by the straight lines emanating from the origin of the graph. The idle speed ($N_{MIN}=1000$ rpm) is indicated by a lower horizontal line, while the maximum permissible engine speed ($N_{MAX}=5500$ rpm) is indicated by an upper horizontal line. The maximum vehicle speed is defined by a vertical line at the right hand edge of the graph.

The graph of FIG. 11 is divided into a number of discrete operating regions. "A" designates the normal region of operation of the engine-CVT system. Region "A" is bounded by the line maximum CVT ratio, the line of maximum engine speed, the line of maximum vehicle speed, the line of minimum CVT ratio and the idle speed line. During operation of the system in region "A", clutch 40 is fully engaged and throttle position is wholly a function of engine speed in accordance with the fuel function $f(N_E)$. Operation to the left of the dashed verticle line indicating a drive shaft speed of 1173 rpm is under torque control, while operation to the right of this line is under power control (see the above two equations, and the accelerator pedal sensitivity circuitry illustrated in FIGS. 9 and 10). Region "B" is the region of start-up control, that is, the operation of the engine-CVT system during slow vehicle operation when clutch 40 is only partially engaged. The control for this operation (400) is illustrated in FIG. 8.

Operation of the engine-CVT system is in the remaining three regions "C", "D" and "E" is effectively prevented by the above described control system. That is, operation in region "C" is prevented by the physical limitation of minimum CVT ratio, and by the fuel diminishing circuits comprising fuel diminishing valve 11, pulse width modulator 110, differentiator 112 and fuel diminishing comparator 114 of engine control circuit 100 (FIG. 7). Region "D" is the region of overspeed control, governed by the fuel suspension mechanism 9 and fuel suspension comparator 108 of engine control circuit 100 (FIG. 7), and by amplifier 232 and clipping circuit 236 of sheave pressure generator 200 (FIG. 9). Region E is the region of engine idle control which is governed by amplifier 230 and clipping circuit 234 of sheave pressure generator 200 (FIG. 9).

Also shown on the graph of FIG. 11 is a load line which indicates the engine speed required to maintain any constant vehicle speed along a level road. The term "load" includes road load, final drive losses and the like, and represents the actual load on the engine-CVT system. In order for the control scheme of the invention to function only in accordance with the fuel function so as to maintain engine operation along the ideal operating line, it is desirable that the CVT ratio range include substantially all ratios required to maintain constant vehicle speed for any normally encountered load. That is, the minimum CVT ratio preferably is smaller than that required to maintain constant vehicle speed along a level road, and the maximum CVT ratio preferably is greater than that required to maintain constant vehicle speed up the steepest grade which one might expect to encounter. This relationship is graphically illustrated by the physical location of the load line in the graph of FIG. 11 above the line of minimum CVT ratio in region "A". All other load lines should lie below the line of maximum CVT ratio. A desirable CVT ratio range for accomplishing this is approximately 11:1 with, for example, a maximum CVT ratio of 22:1 (total vehicle ratio, including final drive ratio), and a minimum CVT ratio of 2:1. A transmission having such a wide ratio range is disclosed in commonly assigned application Ser. No. 290,293, filed Aug. 5, 1981. Of course, a CVT having a smaller ratio range would be operable, but would not have as much flexibility as one with a wider range.

Referring to FIG. 6, the mechanics of a change in CVT ratio now will be described with reference to the axial forces produced by the pressurized fluid in chambers 26 and 36. The lower curve in FIG. 6 is a plot of steady state axial force on movable portion 24 of driven sheave 20 as a function of CVT ratio. Similarly, the upper curve is a plot of steady state axial force tending to resist inward movement of movable portion 34 as a function of CVT ratio. As described below, when for example a signal is generated to increase the ratio of the CVT from 1.0 to approximately 1.7, the fluid pressure in chamber 26 is increased to raise the axial force from approximately 175 kg. to, ultimately, approximately 270 kg. Movable portion 24 does not move instantaneously, however, due to the inertia of the system. Accordingly, the curve which represents the transient change taking place in sheave 20 is defined by movement from point A to point B at a constant ratio of 1.0, and then to point C where equilibrium is reached. Correspondingly, an increase in pressure in chamber 36 of driver sheave 30 results in an increase in axial force of movable portion 34 of sheave 30 from approximately 315 kg. (point D) to approximately 380 kg. (equilibrium point E). Despite this increase in axial force, the increase tension on belt 15 occasioned by expansion of the diameter of sheave 20 forces the two portions 32, 34 of sheave 30 apart so that sheave 30 has a smaller driving diameter. Driver sheave 30, therefore, follows in a controlled manner any changes occurring to driven sheave 20.

Sheave pressure generator 300 geneates a pressure appropriate for driver sheave 30 as a function of ratio R and measured output torque $T_O$. This function has been found to satisfactorily tension belt 15, without undue stress, and effect a smooth change of ratio. And example of a function suitable for this purpose is as follows:

$$P_{DR} + K_1 + \left( \frac{K_2}{R} + K_3 \right) T_O$$

there $P_{DR}$ is the fluid pressure in chamber 36 of driver sheave 30, and $K_1$, $K_2$ and $K_3$ are appropriately selected constants.

SUMMARY OF THE INVENTION

While the novel control system described above overcomes many of the problems associated with CVT systems, a great number of discrete components are required to implement the system. Accordingly, the system is costly to manufacture, difficult to install in host vehicles and is more susceptible to breakdown. Moreover, it is not practical to include in such a system every desirable control feature that the system should have. To do so would result in a system that is unduly complex. For example, it has been found that when the engine is operating below a certain minimum speed, there is a tendency for the engine to stall if the fuel diminishing feature disclosed in FIG. 7 is activated. Ideally, the fuel diminishing feature should not be activated unless the engine is operating above a minimum speed. Such a provision is absent from the control system disclosed above and would require the addition of several more components to implement in such a system. In a microprocessor controlled system, however, such a feature could be implemented by utilizing a fuel diminishing algorithm executed by the microprocessor. Moreover, a microprocessor controlled system offers the advantage of faster and more precise control. Thus, while the CVT control system disclosed above represents a substantial improvement over such systems known in the prior art, it is not the ideal system.

It is therefore the overall object of the present invention to overcome the above-noted disadvantages and deficiences of engine-CVT control schemes implemented with discrete components.

It is a specific object of the present invention to provide an improved system for controlling the inherent tendency of the engine of a CVT power delivery system to speed up upon a commanded decrease in power delivery.

It is a further specific object of the present invention to provide an improved system for controlling the inherent tendency of the engine of a CVT power delivery system to speed up upon a commanded decrease in power delivery wherein the system is economical to manufacture and easy to install.

It is a still further specific object of the present invention to provide an improved system for controlling the inherent tendency of the engine of a CVT power delivery system to speed up upon a commanded decrease in power delivery wherein the system can be implemented using a small number of parts, is more reliable than such systems known in the prior art, and provides more accurate control.

It is another object of the present invention is to provide more accurate and precise fuel diminishing control by incorporating a novel fuel diminishing algorithm.

It is another specific object of the present invention to provide an improved system for controlling the inherent tendency of the engine of a CVT power delivery system to speed up upon a commanded decrease in power delivery wherein the system provides faster and more precise control than systems known in the prior art.

The present invention represents an improvement over the CVT control system disclosed in pending application Ser. Nos. 380,922 and 390,923 filed May 21, 1982 and discussed above with reference to FIGS. 4–11. While the control system described in the pending applications overcomes many of the disadvantages and deficiencies associated with CVT control systems known in the prior art, many discrete components are required to implement the system. It has been found that the use of microprocessor technology and a novel algorithm can significantly reduce the number of components required for the system, while permitting more precise and accurate feul diminishing control. Reducing the number of components results in a system that is more reliable, less costly to manufacture and is easier to maintain. Moreover, the use of microprocessor technology and the algorithms of the instant invention provide for faster and more precise control.

The present invention is more particularly directed to the use of microprocessor technology to control the inherent tendency of the engine of a CVT power delivery system to speed up upon a commanded decrease in power delivery. Accordingly, the fuel diminishing feature performed by pulse width modulator 110 and differentiator 112, shown in FIG. 7, is performed by the microprocessor controlled system of the present invention. Thus, the duty cycle of fuel diminishing valve 11 is determined by a microprocessor, with the percentage of the duty cycle during which fuel diminishing valve 11 is held open being inversely proportional to the rate at which accelerator pedal position decreases ($-\alpha$). Moreover, the microprocessor controlled fuel diminishing feature is only activated when engine speed is above a predetermined minimum speed. Thus, at low engine speeds, the fuel diminishing feature will not be activated, preventing the engine from stalling for lack of fuel.

To avoid confusion with the fuel diminishing system disclosed in the above-mentioned pending applications, the corresponding system of the present invention will be referred to hereafter as a fuel cut or fuel cutting system.

BRIEF DESCRIPTION OF THE DRAWINGS

The novel features of the present invention are set forth with particularity in the appended claims, but the invention will be understood more fully and clearly from the following detailed description of the invention as set forth in the accompanying drawings, in which:

FIG. 7 primarily relates to the engine control circuit;

FIG. 8 primarily relates to the starting clutch control circuit;

FIG. 9 primarily relates to the sheave pressure generators;

FIG. 10 illustrates a modification of the pressure generator for the driven sheave illustrated in FIG. 9.

DETAILED DESCRIPTION OF THE PREFERRED EMBODIMENT

The system of FIGS. 4-11 may also be implemented using a computer system such as a microprocessor as mentioned above. As used herein, the term "microprocessor" includes any and all computer systems. Such a control system is illustrated in block diagram form in FIG. 12. The control system is comprised of CPU 700 operating at a clock frequency controlled by crystal 701. CPU 700 may be selected from a number of microprocessor units known in the prior art and can be a four bit, eight bit or sixteen bit device. The frequency of crystal 701 can be any frequency suitable for operating CPU 700. Coupled to CPU 700 via address/data bus 705 are ROM 702, RAM 703 and I/O ports 704. ROM 702 contains a stored program which CPU 700 executes when the control system is operating. The algorithm for the program stored in ROM 702 will be discussed below with reference to FIGS. 14, 15 and 16. RAM 703 is a scratch pad memory used to temporarily store intermediate values calculated by CPU 700 during execuion of the program stored in ROM 702 and to store values read from the input ports of I/O ports 704. ROM 702 and RAM 703 may also be selected from among a number of read only and read/write memories, respectively, which are presently known in the art. I/O ports 704 is provided for interfacing signals between CPU 700 and external devices as will be explained in greater detail below. I/O ports 704 may comprise one or more peripheral interface large scale integrated circuits selected from among those presently known in the art or may consist of a plurality of addressable buffer circuits such as AND gates, OR gates and invertors. It should also be understood, that ROM 702, RAM 703 and I/O ports 704 are provided with the appropriate address selection and data interface circuitry required by CPU 700.

Figure 12:
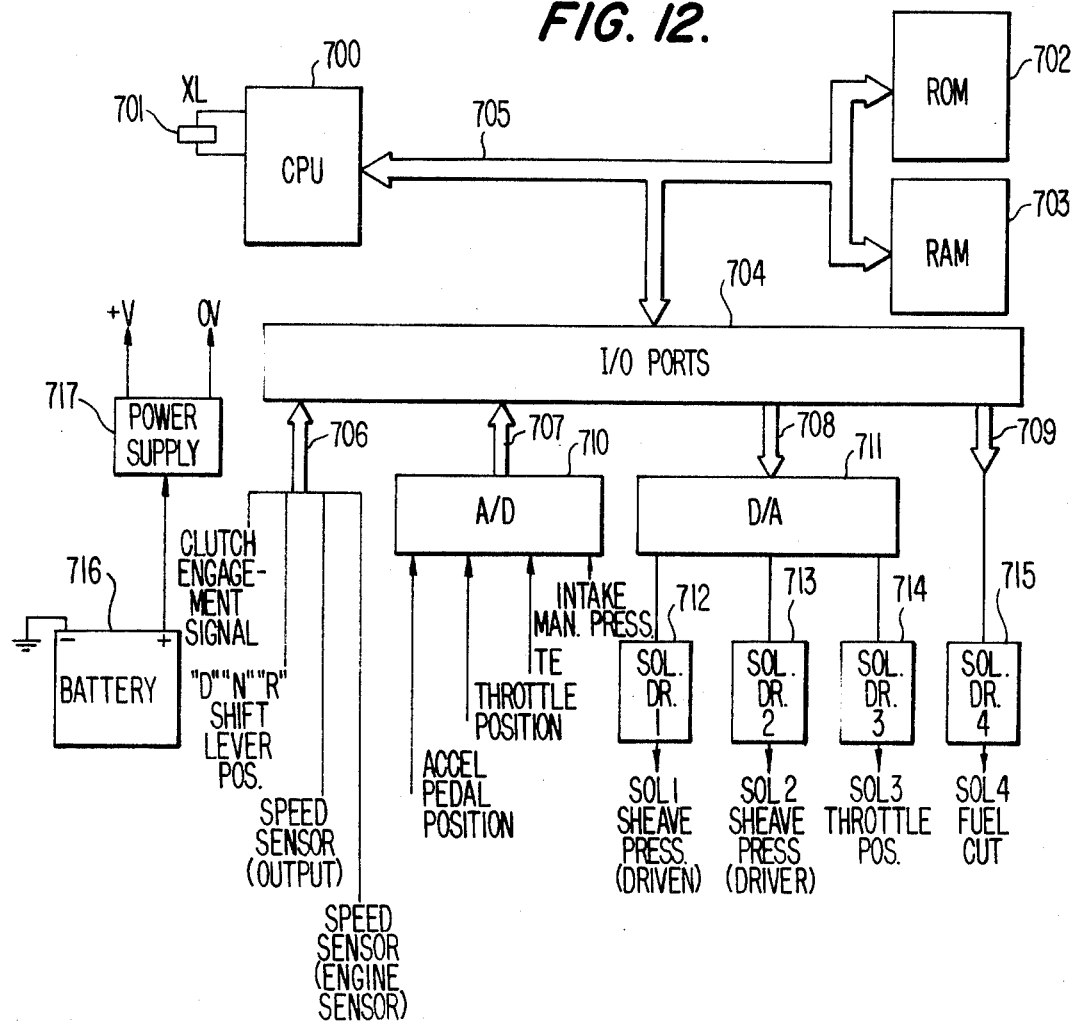
FIG. 12 is a block diagram showing a microprocessor controlled scheme for an engine-CVT in accordance with the present invention.

I/O ports 704 comprises a plurality of data input ports 706 and 707 for receiving input signals from external devices and a plurality of data output ports 708 and 709 for providing output signals to external devices. Analog to digital (A/D) convertor 710 is shown connected to input port 707 and is provided for converting analog input signals to corresponding digital values for processing by CPU 700. Although only one A/D convertor is shown, it should be understood that a plurality of such convertors may be connected to input port 707. In the present invention, the inputs of A/D convertor 710 are shown connected to indicators which provide an analog signal representative of accelerator pedal position, throttle position, engine torque ($T_E$) and intake manifold pressure. These analog signals are converted to digital form by A/D convertor 710 for processing by CPU 700. Those devices which provide input signals which do not require conversion may be connected directly to input port 706. As shown in FIG. 12, these devices include the clutch engagement signal, the shift lever position indicator signal, the engine speed sensor signal and the drive shaft speed sensor signal. Although not shown, it is also anticipated that, dependent upon the type of speed sensors used, the speed sensor signals may alternatively be connected to respective frequency to voltage (F/V) convertors, the outputs of which are in turn connected to A/D convertor 710. It should also be understood that those devices which are connected directly to I/O ports 704 may alternatively be connected to input port 706 via appropriate buffering circuitry (not shown) and may each comprise a plurality of individual inputs.

Digital to analog (D/A) convertor 711 is shown connected to output port 708 and is provided for converting digital output signals from CPU 700 to corresponding analog values for controlling external devices. Although only one D/A convertor is shown, it should be understood that a plurality of such convertors may be connected to output port 708. As shown in FIG. 12, the outputs of D/A convertor 711 are shown connected to solenoid drivers 712–714 which operate solenoids for controlling sheave pressure (driven), sheave pressure (driver) and throttle position, respectively. Those external devices which can be driven directly by digital signals may be connected directly to I/O ports 704 via output port 709. For purposes of illustration, solenoid driver 715 for controlling the fuel cut valve is shown connected directly to I/O ports 704 via output port 709. It should be understood that whether solenoid drivers 712–715 are connected to I/O ports 704 directly or via a D/A converter will depend on the driver circuit used for each respective solenoid. Solenoid drivers 712–715 are connected as shown in FIG. 12 merely for the purpose of illustration. It should also be understood that those devices which are connected directly to I/O ports 704 may alternatively be connected to output port 709 via appropriate buffering circuitry (not shown) and may each comprise a plurality of individual outputs.

The microprocessor control system shown in FIG. 12 is powered by battery 716. Battery 716 may be specifically dedicated to the control system or may be a battery which serves a plurality of functions, e.g., the cranking motor battery of the host vehicle. Battery 716 is coupled to power supply 717 which supplies the requisite voltage level to each component of the control system. It is anticipated that power supply 717 comprises one or more voltage regulators and associated filtering circuitry as is well known in the prior art.

Figure 13:
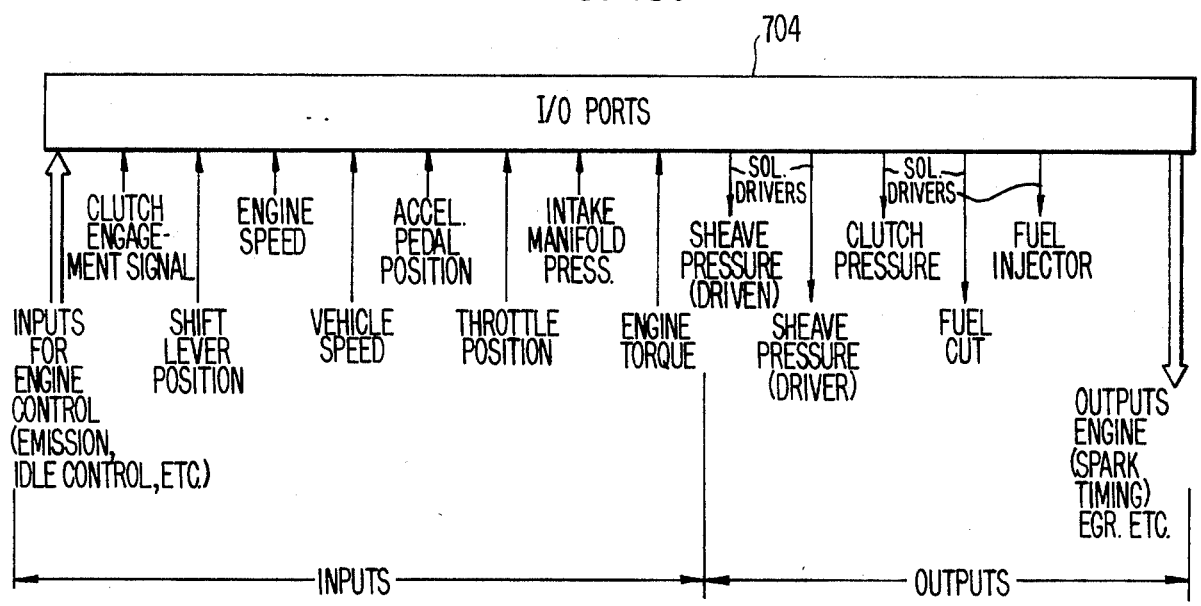
FIG. 13 summarizes the various signals which are supplied to and from the I/O ports shown in FIG. 12.

FIG. 13 summarizes the various signals which are supplied to and from I/O ports 704 to effect a CVT control system in accordance with the present invention.

Figure 14:
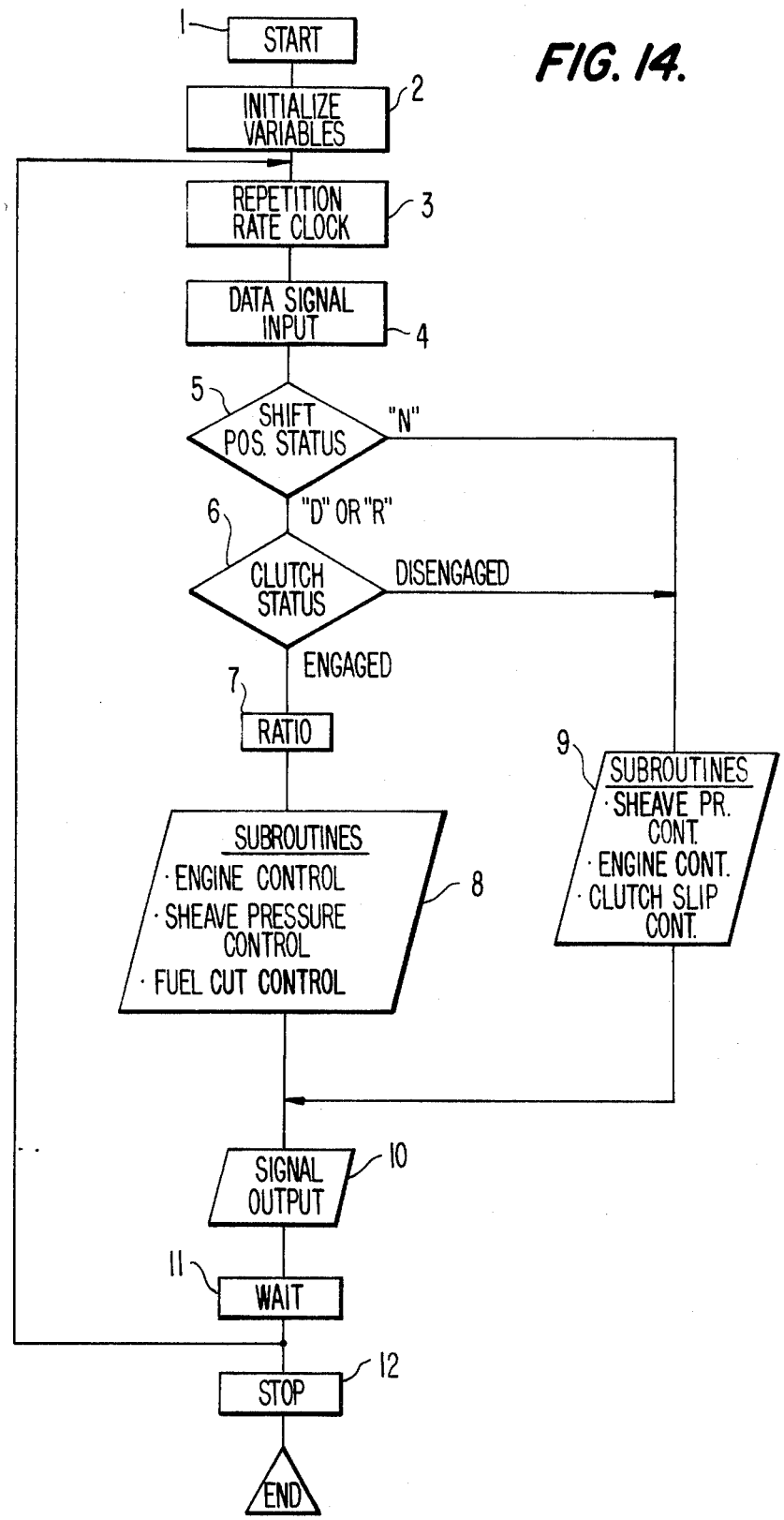
FIG. 14 illustrates a flow chart for the main control routine executed by the microprocessor shown in FIG. 12 in accordance with the present invention.
Figure 16:
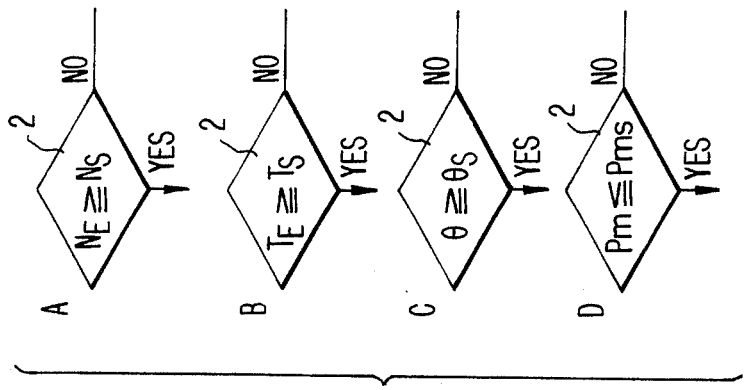
FIG. 16 illustrates alternative parameters which may be compared when executing the subroutine shown in FIG. 15.
Figure 15:
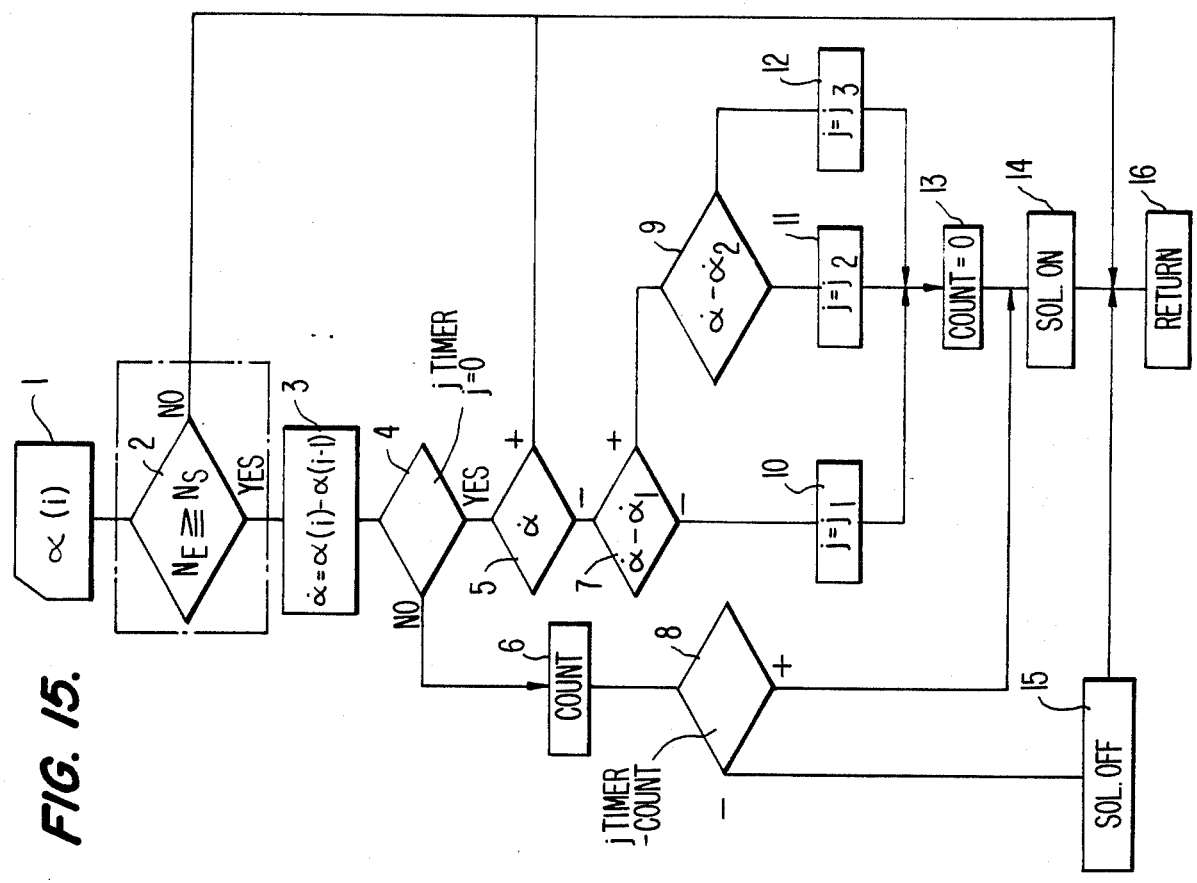
FIG. 15 illustrates a flow chart for the fuel cut subroutine executed by the microprocessor shown in FIG. 12 in accordance with the present invention.

The operation of the microprocessor control system will now be explained with reference to FIGS. 14, 15 and 16. FIG. 14 is the main flow chart illustrating the alogrithm of the program stored in ROM 702. The algorithm is continuously executed by CPU 700 at a predetermined fixed repetition rate established by the repetition rate clock in step 3 of the flow chart. FIG. 15 is a flow chart illustrating the algorithm of the fuel cut subroutine called for in step 8 of the main flow chart. FIG. 16 is a flow chart illustrating alternative parameters which may be compared to determine whether the fuel cut feature should be implemented.

When the control system is activated in step 1, e.g., when the engine of the host vehicle is started, CPU 700 proceeds to step 2 where an initialization routine is executed. During step 2, all operating variables are initialized to predetermine values and are stored in RAM 703. After all variables are initialized and stored, CPU 700 proceeds to step 3 where a repetition rate for the algorithm is set. The repetition rate establishes the frequency at which CPU 700 reads in data from input ports 706 and 707, processes the data and issues appropriate control commands to output ports 708 and 709. Data is read into CPU 700 during step 4 and is processed during subsequent steps to provide the appropriate control commands as discussed below.

Figure 1:
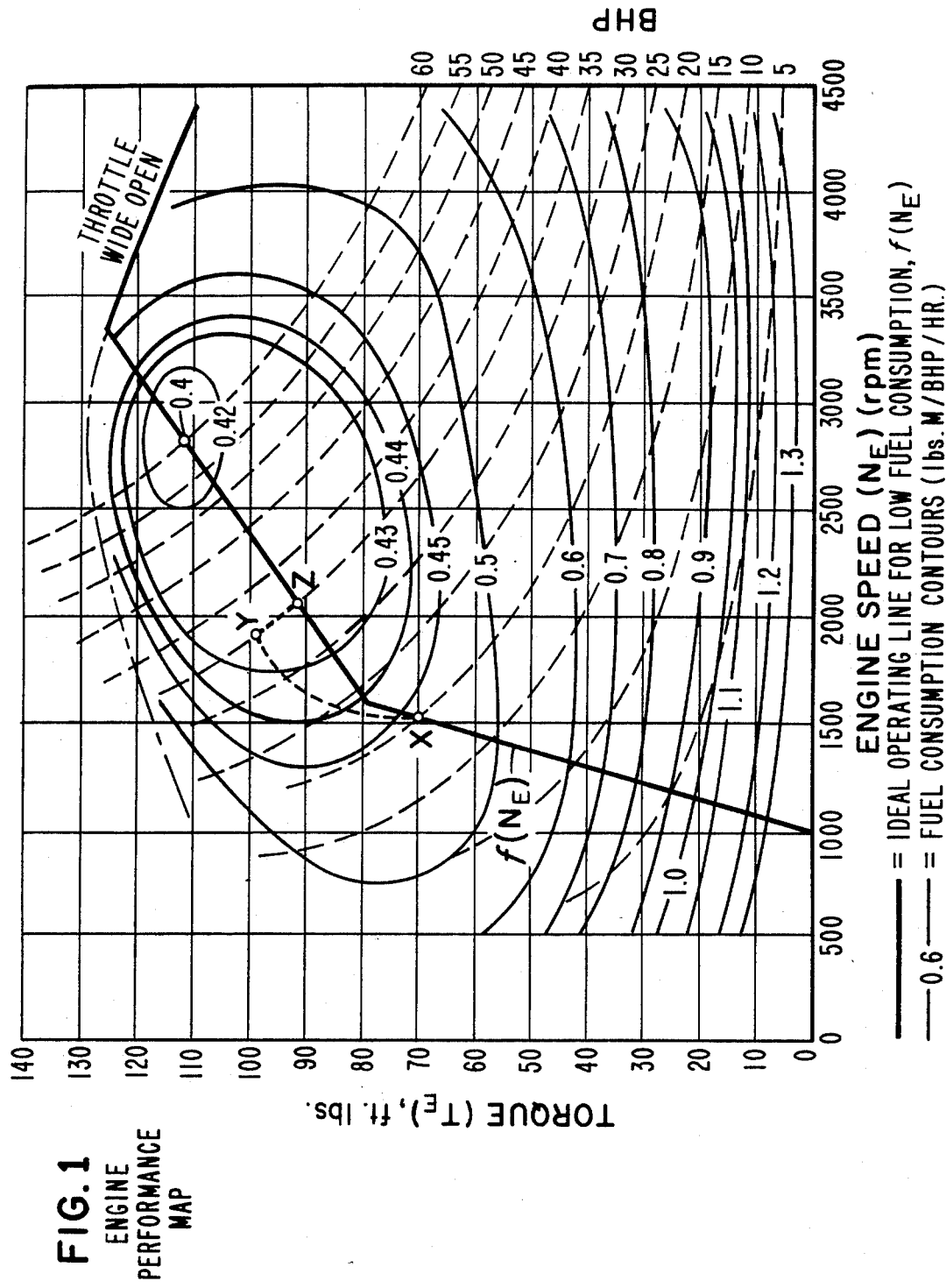
FIG. 1 is the performance map of a typical four cylinder passenger car engine having a displacement of approximately 2.5 liters.
Figure 2:
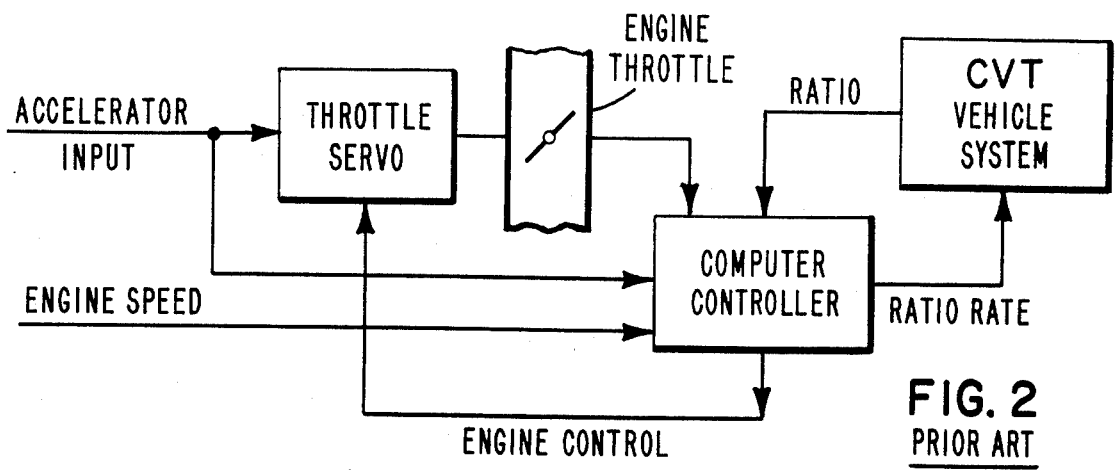
FIGS. 2 and 3 illustrate two forms of prior art engine-CVT control schemes.
Figure 3:
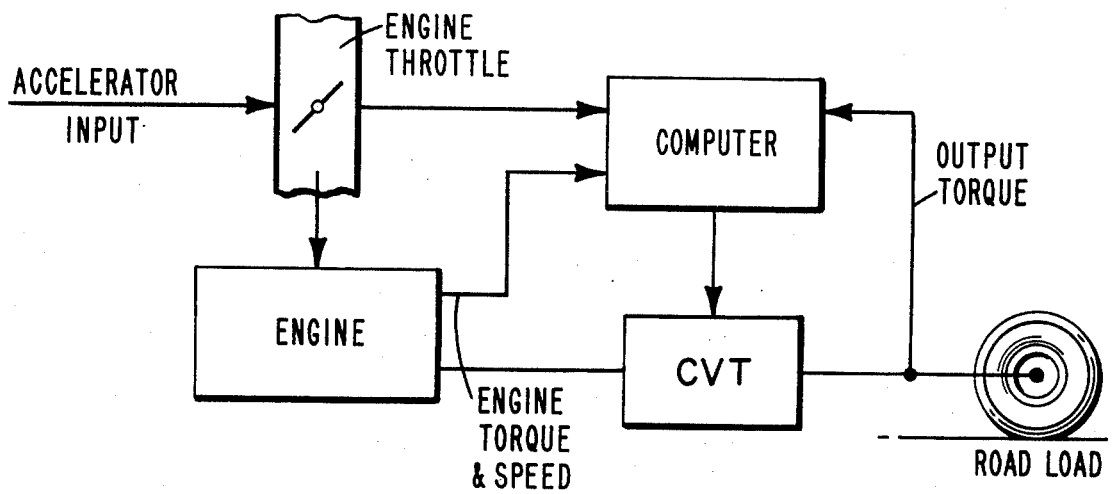
Figure 4:
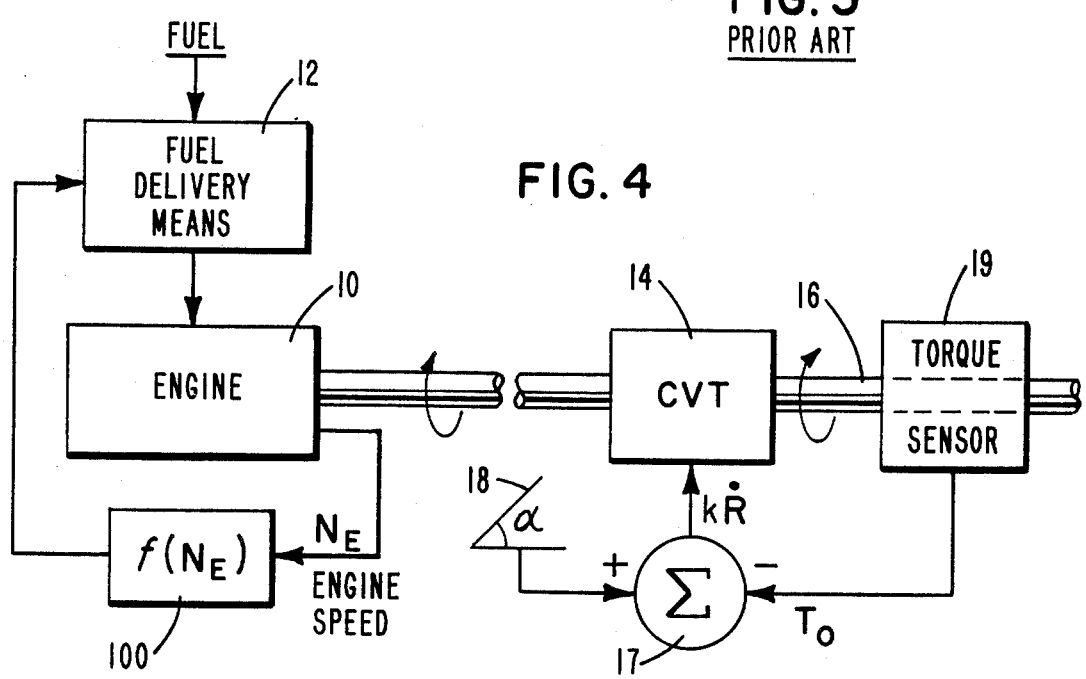
FIG. 4 is a schematic illustration showing the functional relationships of the components of an engine-CVT control scheme disclosed in application Ser. Nos. 380,922 and 380,923 filed May 21, 1982.
Figure 5:
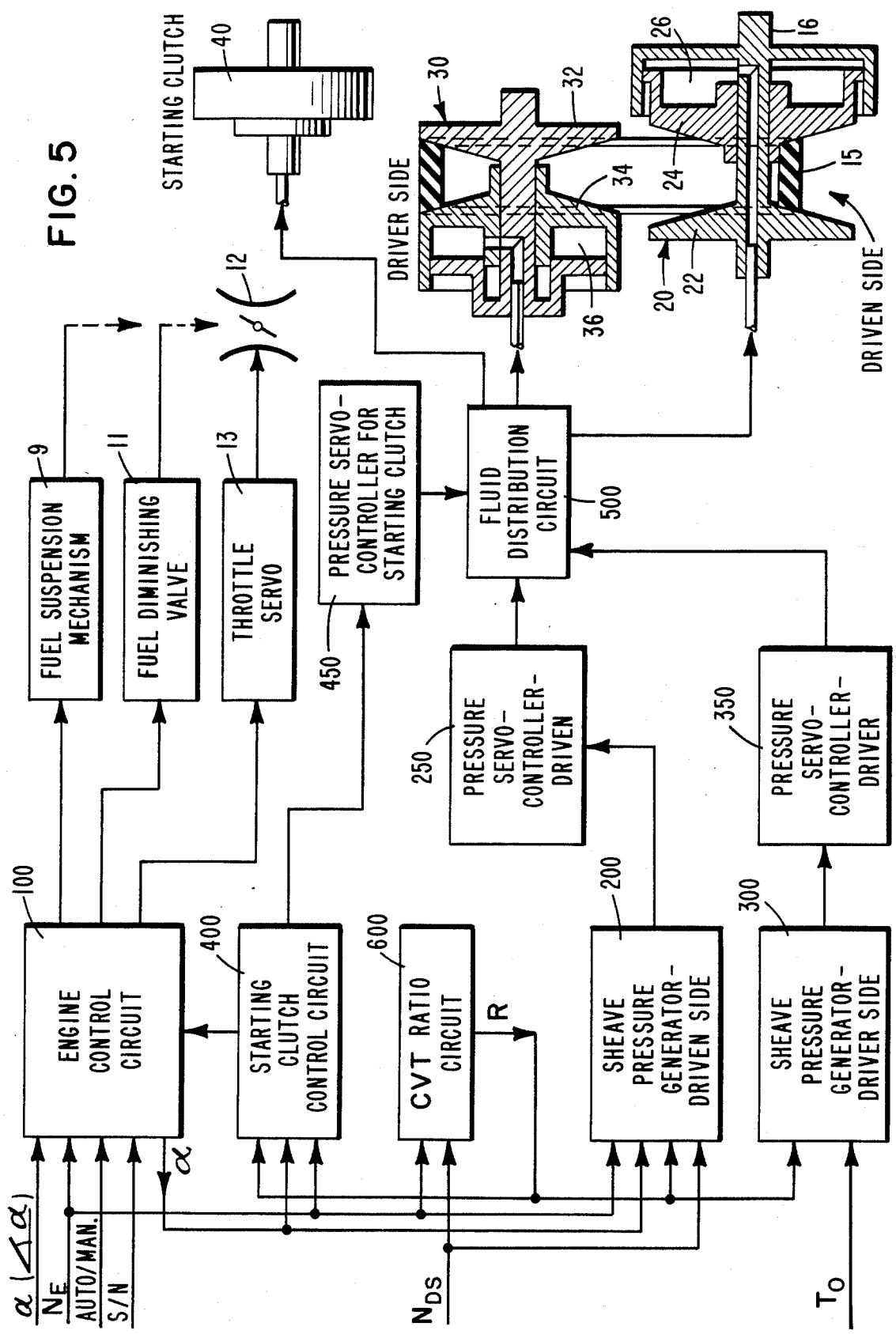
FIG. 5 is a schematic illustration showing the entire control system of FIG. 4 and its relationship to the CVT sheave and belt drive, and the vehicle starting clutch.
Figure 6:
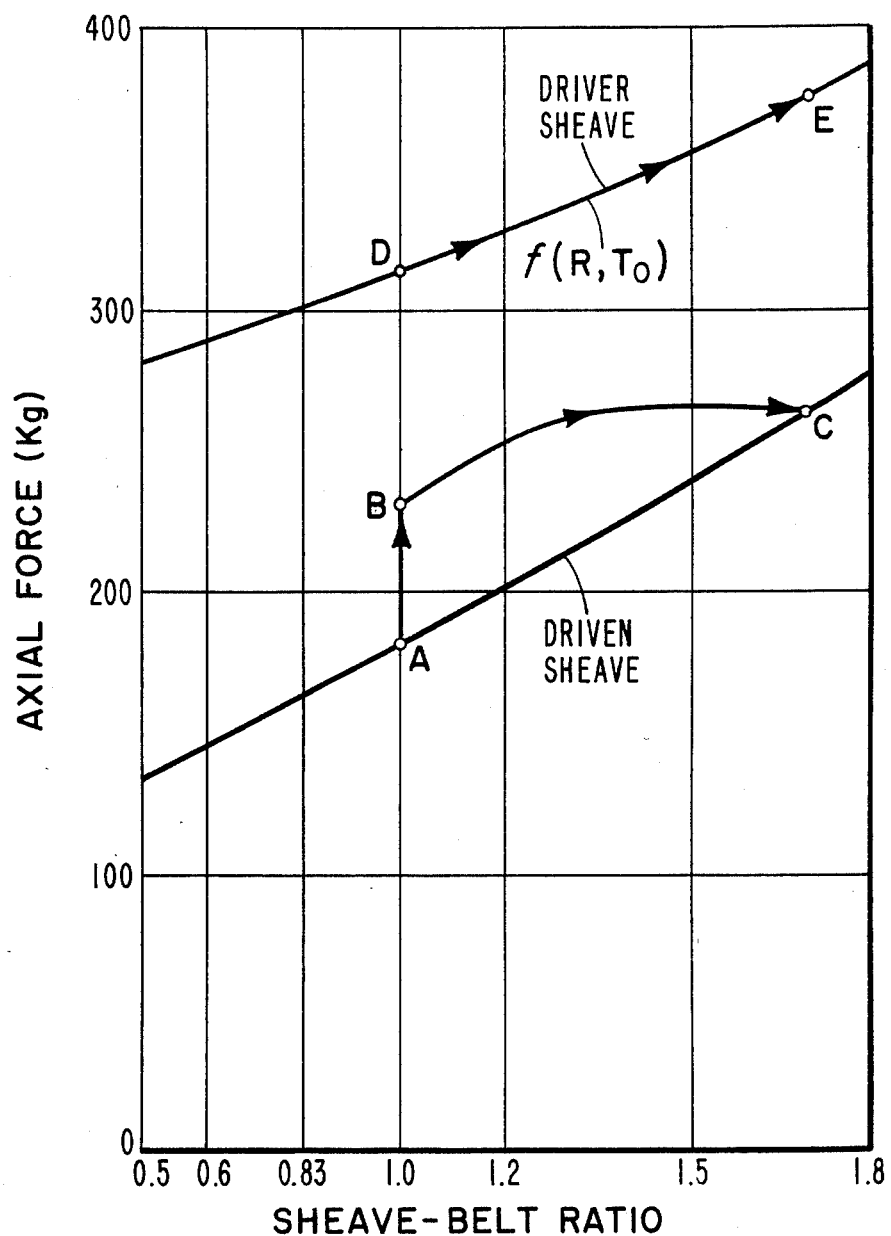
FIG. 6 is a graph which shows the forces applied to the driver and driven sheaves of the CVT as a function of transmission ratio.
Figure 7:
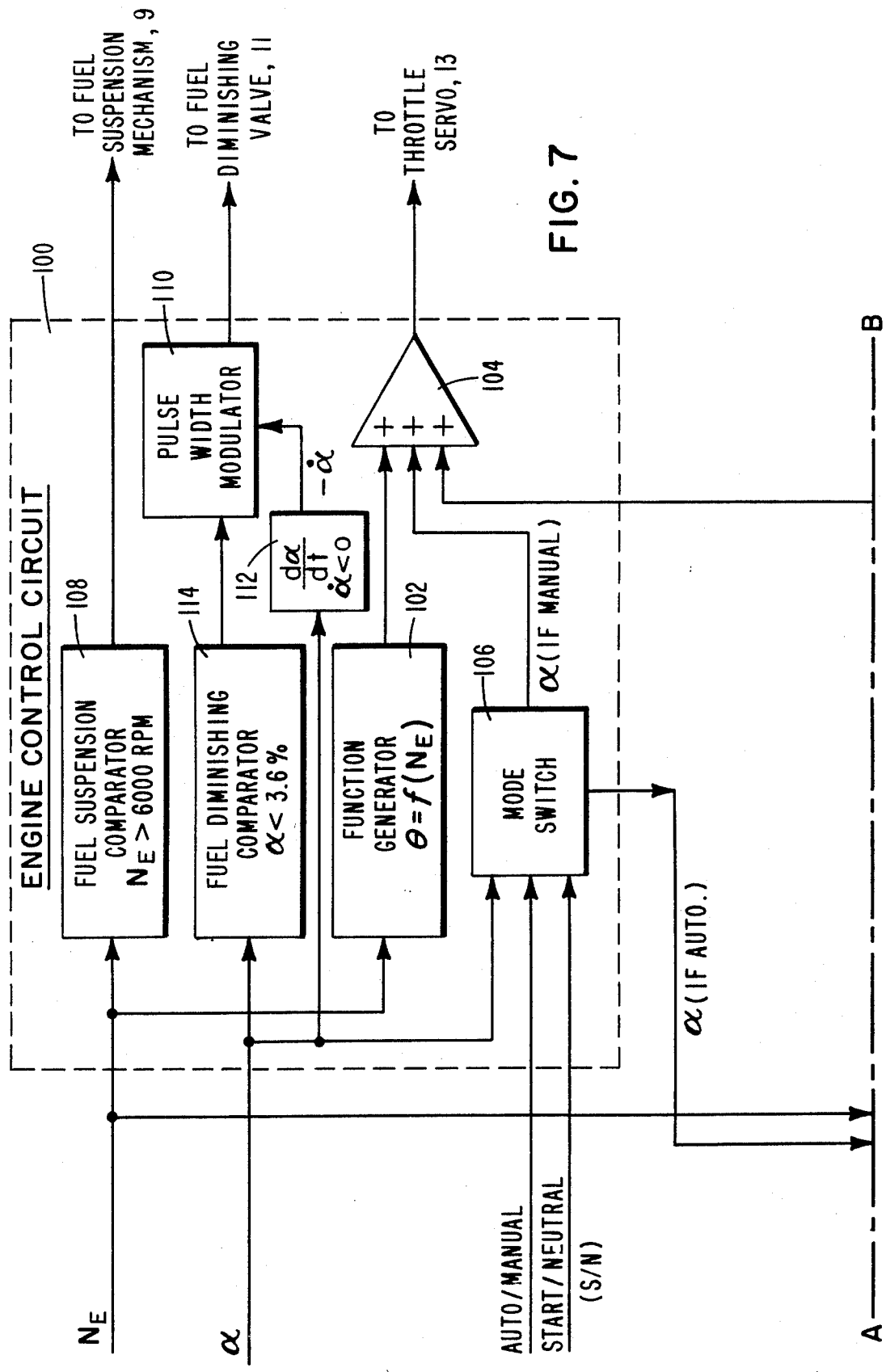
FIGS. 7 through 10 together schematically represent the entire engine-CVT control scheme shown in FIG. 4, the figures being interrelated as indicated therein by lines A-B and C-D.
Figure 8:
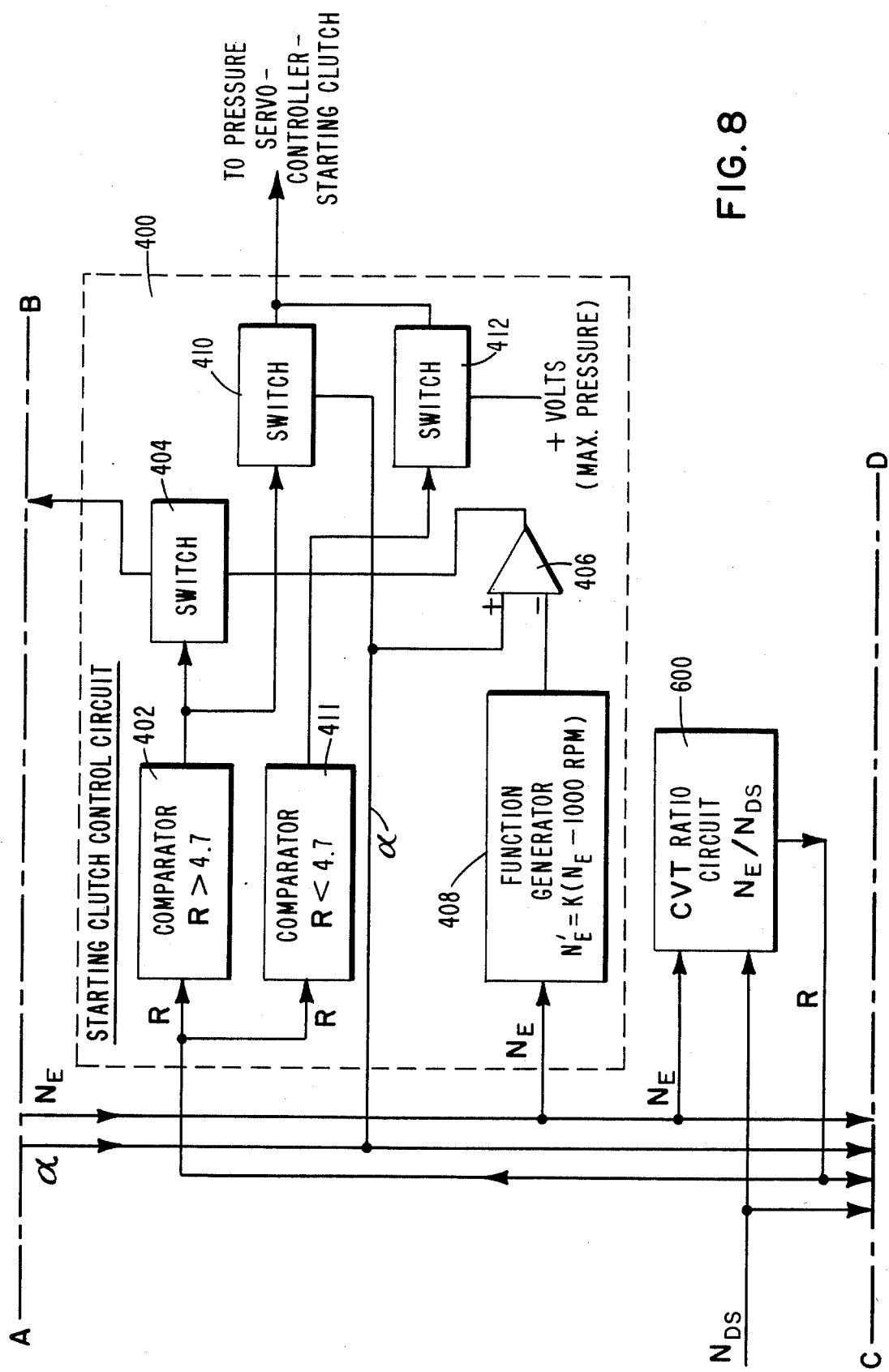
Figure 9:
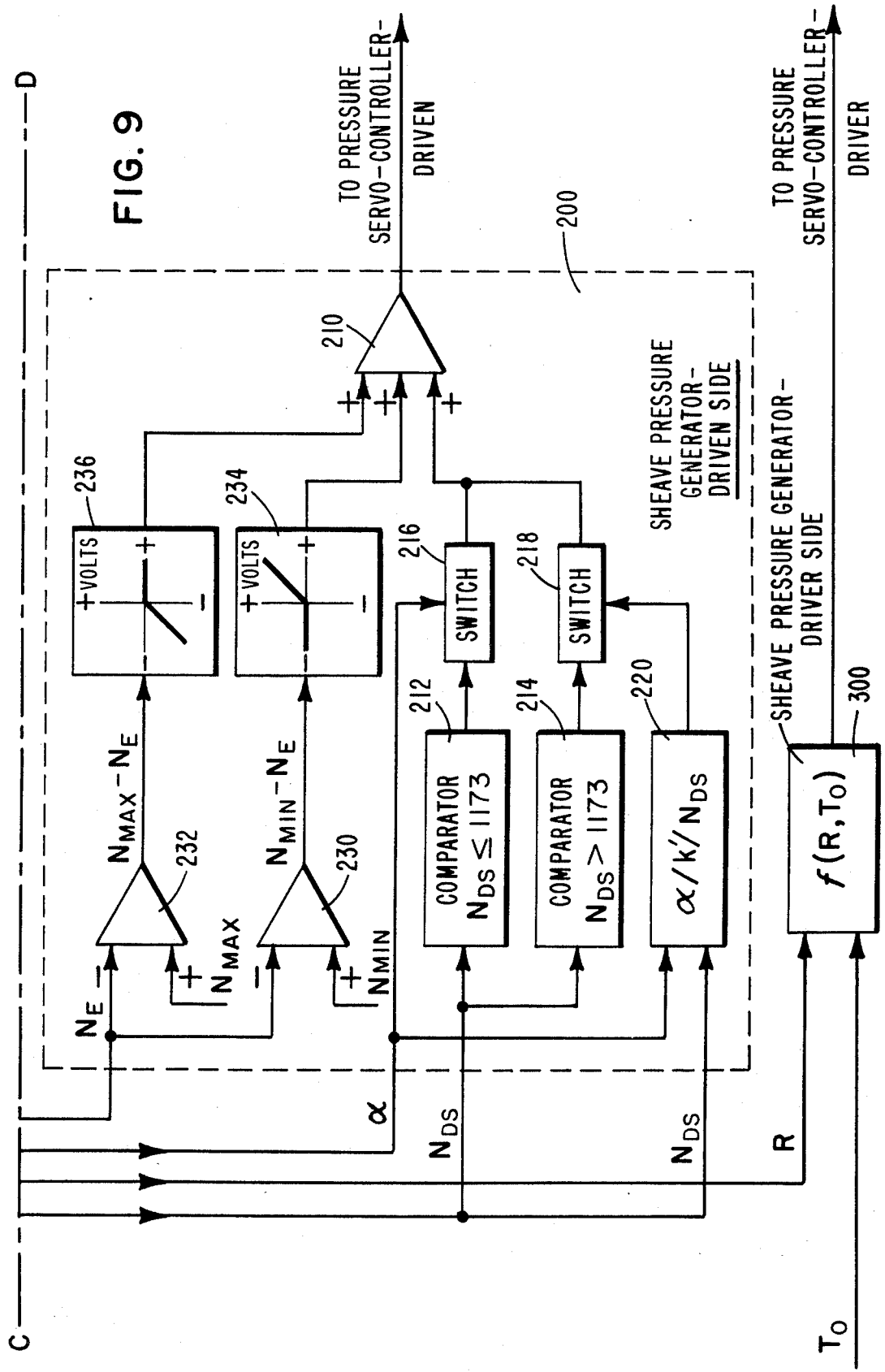
Figure 10:
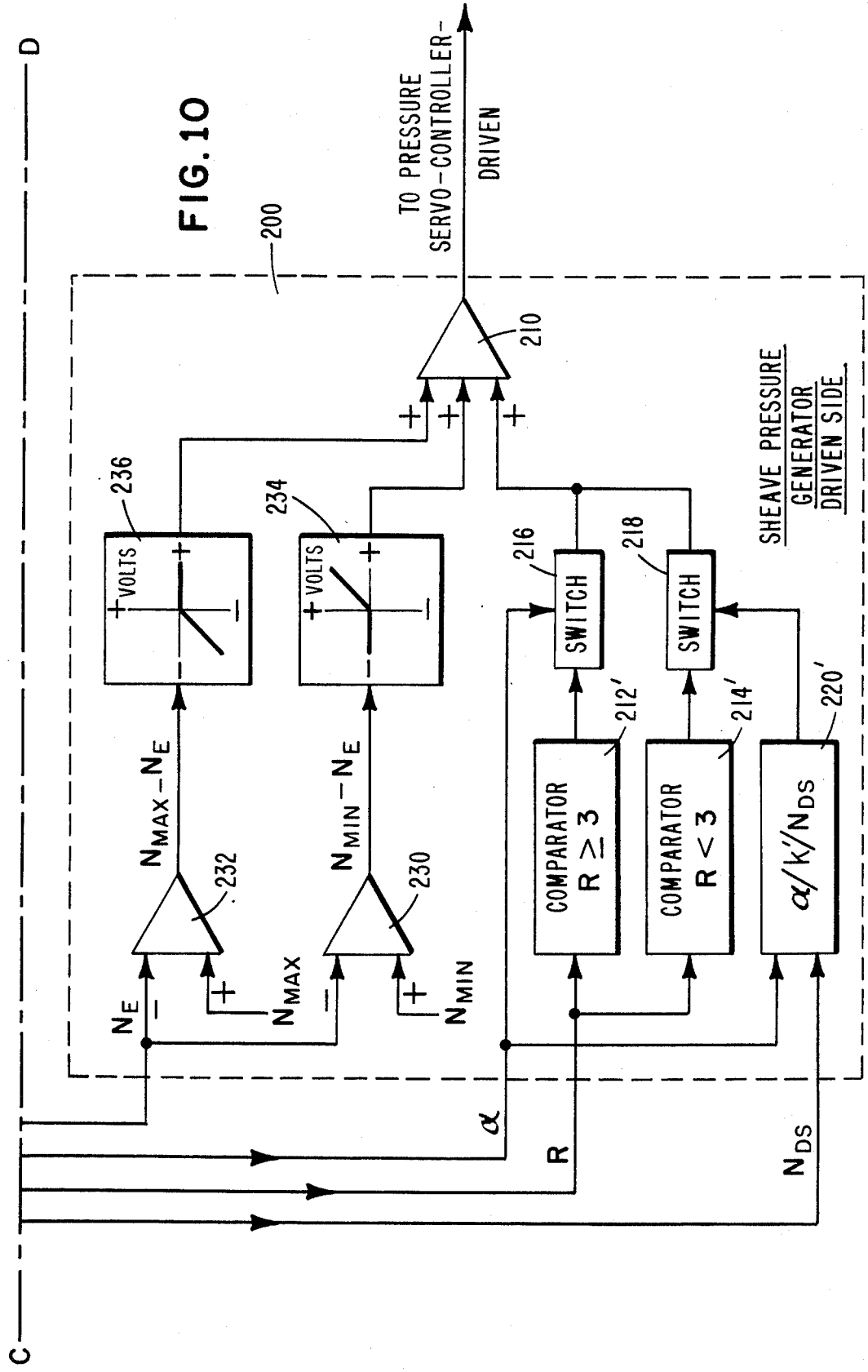
Figure 11:
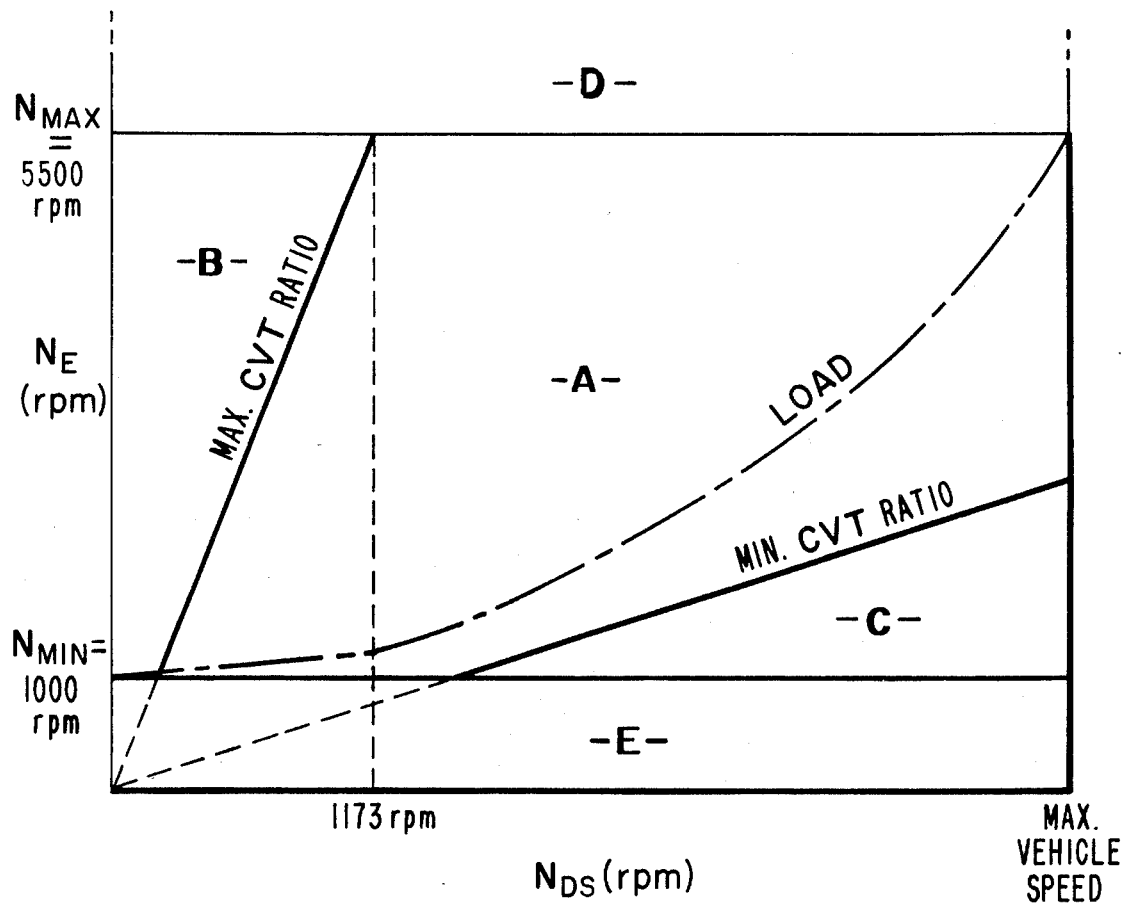
FIG. 11 is a graphical representation of the operation of an engine-CVT system in accordance with the control scheme of shown in FIG. 4.

In step 5, CPU 700 determines whether the shift position lever is in the neutral, drive or reverse position. If the lever is in the neutral position, CPU 700 proceeds to step 9 where subroutines process the data input during step 4 to provide appropriate commands for sheave pressure control (FIGS. 9 and 10), engine control (FIG. 7) and clutch slip control (FIG. 8). From step 9, CPU 700 proceeds to step 10.

If the shift position lever is in the drive or reverse position, CPU 700 proceeds from step 5 to step 6. During step 6, the status of the clutch is determined. If the clutch is not engaged, CPU 700 proceeds to step 9 and executes the subroutines mentioned above and then goes to step 10. If the clutch is engaged, CPU 700 proceeds from step 6 to step 7. In step 7, CVT ratio R is determined by dividing engine speed $N_E$ by drive shaft speed $N_{DS}$ (FIG. 8 ratio circuit 600). CPU 700 then proceeds to step 8 where subroutines further process the data input during step 4 to provide appropriate commands for engine control (FIG. 7), sheave pressure control (FIGS. 9 and 10) and fuel cut control (FIG. 7—differentiator 112 and pulse width modulator 110). The operation of the subroutine which provides fuel cut control in accordance with the present invention will be explained in greater detail below with reference to FIG. 15.

After the subroutines in step 8 have been executed, CPU 700 proceeds to step 10 where the various control commands calculated and determined during execution of the above mentioned subroutines are output in the form of commands to the various control devices via output ports 708 and 709. After step 8 is completed, CPU 700 enters a wait state shown in step 11. The wait state continues until expiration of the repetition clock set in step 3, whereupon CPU 700 returns to step 3, resets the repetition clock and repeats the alogrithm.

As discussed above, there is a tendency of the vehicle to speed up when the accelerator pedal is released. This phenomenon occurs upon deceleration because of the vehicle inertia becomes coupled to the inertia of a relatively unthrottled engine through a transmission whose ratio is changing towards overdrive. This undesirable tendency is even more pronounced when the accelerator pedal is released suddenly and completely. This anomalous behavior is prevented by reducing fuel flow to the engine when pressure on the accelerator pedal is relieved, the reduction of fuel flow being proportional to the rate at which pedal position decreases ($-\alpha$), and by reducing fuel flow even further when the accelerator pedal position drops below 3.6% of full excursion.

In the present invention, the microprocessor, by utilizing the novel process of the present invention, performs this function. As mentioned earlier, the fuel diminishing function of the present invention is referred to as fuel cutting in order to avoid confusion between fuel diminishing disclosed in the pending applications and implemented with discrete components and the process disclosed by the present invention and implemented with microprocessor technology. The fuel cutting process in accordance with the present invention will now be discussed with reference to FIGS. 15-20.

Figure 18:
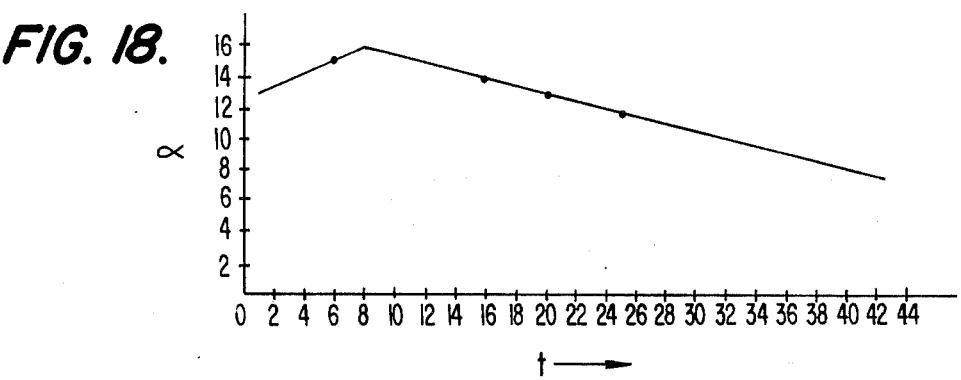
FIG. 18 is a graphical representation of changes in accelerator pedal position.

FIG. 18 is a graph of accelerator pedal travel with accelerator pedal position α on the vertical axis and increments of time t on the horizontal axis. As shown on the graph, the accelerator is moving in a positive direction between time marks 1 and 8, indicating that the accelerator is being depressed. After time mark 8, the accelerator pedal is shown moving in a negative direction, indicating that the accelerator is being released. With known first and second accelerator pedal positions, the change in accelerator position can be determined from the relationship:

$$\dot{\alpha} = \alpha(i) - \alpha(i-1)$$

where:
$\dot{\alpha}$ = change in accelerator pedal position
$\alpha(i-1)$ = first accelerator position
$\alpha(i)$ = second accelerator position From this relationship, it can be seen that where $\dot{\alpha} = 0$ there is no overall change in accelerator position. For values of $\dot{\alpha} > 0$, the overall change in accelerator position is in a positive direction, indicating that the accelerator pedal is being depressed. For values of $\dot{\alpha} < 0$, the overall change in accelerator position is in a negative direction indicating that the accelerator pedal is being released. Therefore, in situations where $\alpha < 0$, there is a tendency for the engine to speed up when the engine should be slowing down.

Figure 19:
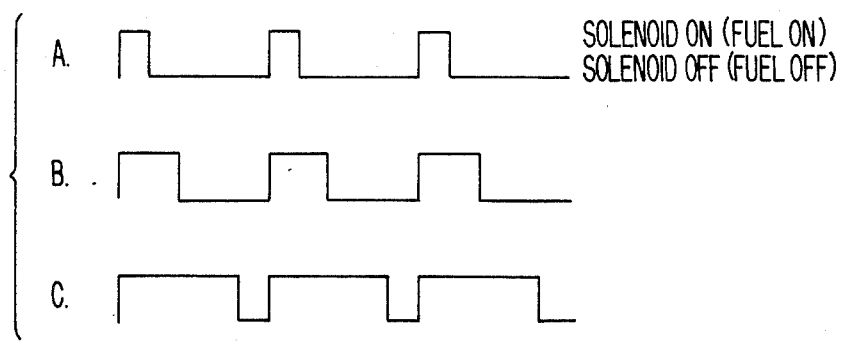
FIG. 19 is a graphical representation of various duty cycles of the fuel cut solenoid in accordance with the present invention.

FIG. 19 illustrates the duty cycle of fuel cut solenoid driver 715, i.e., solenoid driver for fuel diminishing valve 11, in response to the change in accelerator position for α values less than 0. Fuel cut solenoid driver 715 may be a solenoid whose duty cycle varies inversely in accordance with the degree of change in accelerator pedal position. Thus, for larger values of $\dot{\alpha} > 0$ the solenoid duty cycle is correspondingly longer to provide more fuel cut to compensate for engine speed up. For smaller values of $\dot{\alpha} > 0$, the solenoid duty cycle is correspondingly shorter to provide less fuel cut to compensate for engine speed up. Therefore, it can be seen that the duty cycle of fuel cut solenoid driver 715 is modulated in accordance with the degree of change in $\dot{\alpha} > 0$. It should be noted that fuel flows to the engine only during the "on" portion of the solenoid duty cycle. Thus, should the control system fail, fuel cut solenoid driver 715 will remain off and no fuel will flow to the engine.

The position of the accelerator pedal may be sensed by a sensor which produces an analog signal corresponding to the position of the accelerator pedal. This signal may be converted to digital form by A/D convertor 707 for processing by CPU 700 as shown in FIG. 12. A/D conventor 707 may be an 8 bit device which can provide 256 digital levels of analog conversion, each digital level thus representing 100%/256 or 0.3870% of full accelerator pedal travel. Such a resolution is more than adequate for the fuel cut control system of the present invention. A 5 bit A/D convertor is also practical and would provide 32 digital levels of analog conversion, each digital level representing 100%/32 or 3.13% of full accelerator pedal travel. The operation of the fuel cut subroutine called for in step 8 of the flow chart in FIG. 14 will now be discussed with reference to FIG. 15.

FIG. 15 is a flow chart of the subroutine which processes the data input during step 4 of the flow chart in FIG. 14 to provide appropriate command signals for fuel cut solenoid 715. For purposes of the following discussion, it is assumed that the control system has just been activated and the subroutine shown in FIG. 15 is being executed for the first time. In step 1, CPU 700 reads the current accelerator pedal position (i) from A/D convertor 710 and stores the data in RAM 703. CPU 700 proceeds to step 2 where a comparison is made between engine speed $N_E$ and a predetermined engine speed $N_S$. If engine speed is less than or equal to $N_S$, fuel cut does not take place and CPU 700 proceeds to step 16 which is a return to the main control routine. $N_S$ is set to a predetermined minimum engine speed during step 2 of the main flow chart shown in FIG. 14. $N_S$ should be set to a value sufficiently high to prevent the engine from dying during the fuel cut function. If engine speed $N_E$ is higher than $N_S$, CPU 700 proceeds to step 3. During step 3 CPU 700 compares the current accelerator pedal position α(i), which was read in during step 1, to the previous value of accelerator pedal position α(i−1) to arrive at a change in accelerator position $\dot{\alpha}$. Because this is the first execution of the subroutine, α(i−1) will be the value assigned during initialization step 2 of the main control routine shown in FIG. 14 (e.g., α(i−1) may be initialized to 0). CPU 700 then proceeds to step 4 where the status of the fuel cut solenoid duty cycle timer (j Timer) is checked. The value stored in the j Timer determines the duty cycle of the fuel cut solenoid and is established dependent upon the degree of change in accelerator pedal position $\dot{\alpha}$. The j Timer is initially set to a 0 value which means that the fuel cut solenoid is not activated. Accordingly, CPU 700 proceeds from step 4 to step 5. In step 5, the value for the change in accelerator pedal position α, which was determined in step 3, is checked. If this is a positive value, deceleration is not taking place and no fuel cut is required. Thus, CPU 700 proceeds from step 5 to step 16 which is a return to the main control routine. If $\dot{\alpha}$ is a negative value, deceleration is indicated and fuel cut is required. Thus, CPU 700 proceeds from step 5 to step 7. In step 7, CPU 700 compares the value of $\dot{\alpha}$ determined in step 3 with a predetermined value of $\dot{\alpha}$. The purpose of step 7 and succeeding step 9 is to determine the duty cycle of the fuel cut solenoid appropriate for the degree of change in accelerator position. Thus, $\dot{\alpha}$ is compared to $\dot{\alpha}_1$ in step 7 and $\dot{\alpha}_2$ in step 9. Values for for $\dot{\alpha}_1$ and $\dot{\alpha}_2$ are predetermined and initialized during step 2 of the main routine. If the comparison in step 7 indicates that $\dot{\alpha}$ is larger than $\dot{\alpha}_1$, CPU 700 proceeds to step 9 where α is compared to $\alpha_2$. Otherwise, CPU 700 proceeds to step 10 where the j Timer is set to predetermined value $j_1$. From step 10, CPU 700 proceeds to step 13 where a loop counter is set to 0. While the j Timer holds a value other than 0, the value stored in "COUNT" will be incremented each time the subroutine is entered as will be explained below. CPU 700 proceeds from step 13 to step 14 where the fuel cut solenoid is activated. From step 14, CPU 700 proceeds to step 16 which is a return to the main routine.

With reference again to step 7, if $\dot{\alpha}$ is greater than $\dot{\alpha}_1$, CPU 700 will proceed from step 7 to step 9 as discussed above. In step 9, $\dot{\alpha}$ is compared to $\dot{\alpha}_2$. If $\dot{\alpha}$ is smaller than $\alpha_2$, CPU 700 proceeds to step 11 where the j Timer is set to predetermined value $j_2$. CPU 700 then proceeds to step 13 as discussed above. If α is larger than α₂, CPU 700 proceeds to step 12 where the j Timer is set to predetermined value j₃. CPU 700 then proceeds to step 13 as discussed above.

When the subroutine is entered a second time, steps 1, 2 and 3 are performed as above described. However, in step 3, α(i−1) becomes α(i) which was read in by CPU 700 during the previous pass through the subroutine. Because the j Timer is no longer set to 0, when CPU 700 reaches step 4, it proceeds to step 6 where the value stored in COUNT is incremented. CPU 700 then proceeds to step 8. In step 8, the value stored in the j Timer is compared to the value stored in COUNT. If the COUNT value is less than the j Timer value, the "ON" portion of the fuel cut solenoid duty cycle has not expired and CPU 700 proceeds from step 8 to step 14 and continues as above described. However, if the COUNT value is greater than the j Timer value, the "ON" portion of the fuel cut solenoid cycle has expired and CPU 700 proceeds from step 8 to step 15 where the solenoid is turned off. From step 15, CPU 700 proceeds to step 16 which is a return to the main routine.

In the subroutine illustrated by the flow chart in FIG. 15, the fuel cut subroutine is executed when engine speed $N_E$ is greater than a predetermined speed $N_S$ in order to prevent the engine from dying when the fuel cut solenoid is activated. FIG. 16 illustrates alternative comparison parameters for step 2 of the flow chart in FIG. 15. In FIG. 16A, the fuel cut subroutine is executed as above described. In FIG. 16B, the fuel cut subroutine is executed when engine torque $T_E$ is greater then a predetermined engine torque value $T_S$. In FIG. 16C, the fuel cut subroutine is executed when the throttle position angle $\theta$ is greater than predetermined throttle angle $\theta_S$. In FIG. 16D, the fuel cut subroutine is executed when the intake manifold pressure PM is less than a predetermined intake manifold pressure $P_{MS}$. It should be noted that of the above parameters, a comparison between engine speed $N_E$ and a predetermined minimum engine speed $N_S$ provides the most ideal determination of whether the engine will stall if the fuel cut solenoid is activated.

In FIG. 15, the jTimer is shown set to three discrete levels in accordance with the degree of change in accelerator pedal position. It should be understood, however, that the jTimer may be set to additional levels to provide more precise control over the duty cycle of the fuel cut solenoid.

It has been found that the appropriate setting for the jTimer may also be determined from the linear relationship:

$$j = \text{INT}((\dot{\alpha} * K) + K_1)$$

where:
  j is the setting for the jTimer;
  INT is a program operation which produces an integer value from the quantity enclosed in parenthesis;
  α is the change in accelerator pedal position;
  K is a first constant; and
  K₁ is a second constant.
Such a linear relationship could be substituted for steps 7 and 9–12 of the flow chart shown in FIG. 15.

The degree of fuel cut can also be made a function of transmission ratio R. If the transmission ratio is high and $\dot{\alpha} < 0$ resulting in a fuel cut, the transmission will suddenly go into overdrive with a corresponding jolt to the driver. Accordingly, it has also been found that where the transmission ratio is high, the duty cycle of the fuel cut solenoid should be made smaller to prevent the transmission from going into overdrive and jolting the driver. Thus where the transmission ratio R is greater than a predetermined value $R_S$, the value of the jTime can be established by the linear relationship:

$$j = \text{INT}\left(\left(\dot{\alpha} * \frac{1}{R} * K\right) + K_1\right)$$

where
  j is the value for the jTimer;
  INT is a program operation which produces an integer value from the quantity enclosed in parenthesis;
  $\dot{\alpha}$ is the change in accelerator pedal position;
  (1/R) is the reciprocal of the tranmission ratio; and
  K is a first constant; and
  K₁ is a second constant.

Where it is desired to set the value of the jTimer to discrete values as shown in steps 7 and 9–12 of the flow chart shown in FIG. 15 and where the transmission ratio R is greater than a predetermined value $R_S$, the value of the jTimer can be established by the relationship:

$$j = \text{INT}\left(\left(J * \frac{1}{R} * K\right) + K_1\right)$$

where
  j is the value for the jTimer;
  INT is a program operation which produces an integer value from the quantity enclosed in parenthesis;
  J is a predetermined value for the jTimer produced by steps 10, 11 or 12;
  (1/R) is the reciprocal of the transmission ratio;
  K is a first constant; and
  K₁ is a second constant.

The above relationships provide a value for the fuel cut jTimer which is inversely proportional to transmission ratio. Accordingly, where the transmission ratio is high, the amount of fuel cutting is correspondingly reduced to prevent the adverse effects of the transmission suddenly going into overdrive and jolting the driver.

The above-described microprocessor controlled fuel cut system may be implemented on a standard carburator fuel delivery system, throttle body injection (TBI) fuel delivery system or on an electric fuel injection (EFI) fuel delivery system. In the carburator fuel delivery system, the fuel cut solenoid technique described above is employed. In the TBI and EFI fuel delivery systems, the duty cycle of a fuel injector control means is activated in a manner similar to the fuel cut solenoid described above.

Figure 17:
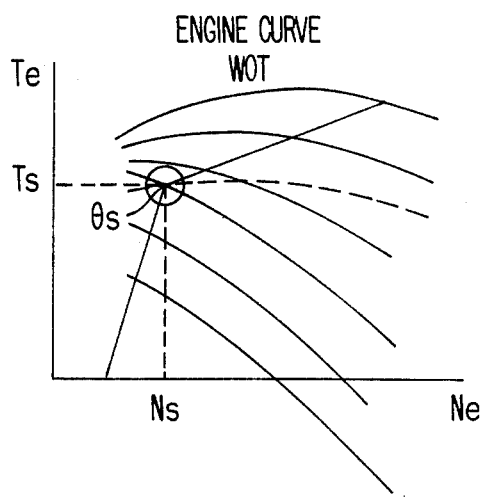
FIG. 17 is a graphical representation of the operation of an engine-CVT system in accordance with the control scheme of the present invention.
Figure 20:
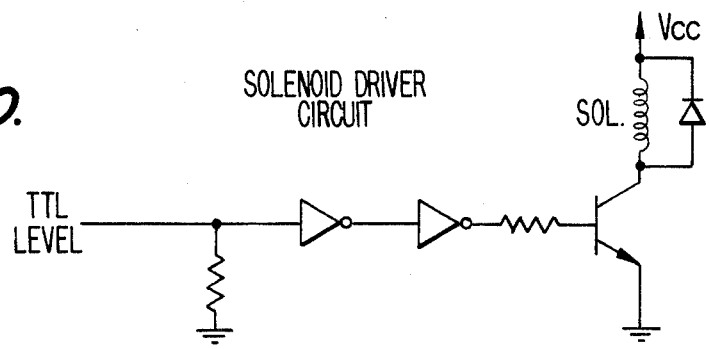
FIG. 20 illustrates an electrical circuit which may be used to drive the various solenoids shown in FIG. 12.

FIG. 17 illustrates that while fuel cutting is taking place, the engine is operated away from the ideal operating line. This condition only lasts for a short period of time after which the engine returns to its ideal operating point. FIG. 20 illustrates a driver circuit which may be used to drive the fuel cut solenoid of the present invention.

The above-described control scheme quite simply, effectively and accurately accomplishes its primary objective of controlling the inherent tendency of the engine to speed up upon a commanded decrease in power delivery. The specific parameter values set forth in the preferred embodiment described above are in no way intended to limit the scope of the invention, it being apparent that these parameters will vary in accordance with engine, transmission and vehicle design, and desired behavior and performance. Numerous modifications of the invention will be apparent to those skilled in the art without departing from the true spirit and scope of the invention which is defined by the appended claims.

I claim:

1. A system for controlling the operation of a power delivery system including an engine of an engine-driven vehicle and a continuously variable ratio transmission coupled to said engine for delivering power from said engine to an output shaft, said engine having fuel delivery means for delivering a variable quantity of fuel thereto, said power delivery system being controlled by command means for commanding a desired power delivery system performance, the system comprising:

actual system performance measuring means for measuring the actual performance of the power delivery system;

ratio control means operatively coupled to said command means and said actual system performance measuring means for controlling the ratio of said transmission as a function of the desired system performance commanded by said command means and the measured actual system performance, the speed of said engine varying as a function of transmission ratio;

fuel function means defining a desired fuel requirement for said engine in relation to engine operating speed;

speed measuring means for measuring the speed of said engine;

fuel control means operatively coupled to said fuel function means and said fuel delivery means for controlling said fuel delivery means only in accordance with the fuel requirement defined by said fuel function means, so that the fuel delivered to said engine is determined only by the speed thereof; and microprocessor controlled fuel cutting means, separate from said fuel control means, for cutting fuel flow to said fuel delivery means below that required by said fuel function means when the system performance commanded by said command means is reduced, wherein said fuel cutting means cuts fuel flow by an amount proportional to the rate at which the system performance commanded by said command means is reduced; said fuel cutting means comprises:

input means for inputting to the microprocessor first and second system performance commands, the microprocessor processing said first and second system performance commands to arrive at a change in commanded system performance; and fuel flow means for controlling the fuel flow to the fuel delivery means at a duty cycle which is inversely proportional to the change in commanded system performance.

2. The system of claim 1 wherein the duty cycle of the fuel delivery means is further set to a selected one of a plurality of predetermined discrete values dependent upon the change in commanded system performance.

3. The system of claim 2 wherein the duty cyle of the fuel delivery means is further set to a value determined by the relationship $INT((j*1/R*K)+K_1)$ where INT is a microprocessor program operation which produces an integer value from the quantity enclosed in parentheses, where j is said selected one of a plurality of predetermined discrete values, where 1/R is the reciprocal of the transmission ratio of the continuously variable ratio transmission and where K is a first predetermined constant and $K_1$ is a second predetermined constant.

4. The system of claim 1 wherein the duty cycle of the fuel delivery means is further set to a value determined by the relationship $INT((\dot{\alpha}*K)+K_1)$ where INT is a microprocessor program operation which produces an integer value from the quantity enclosed in parentheses, where $\dot{\alpha}$ is the change in commanded system performance and where K is a first predetermined constant and $K_1$ is a second predetermined constant.

5. The system of claim 4 wherein the duty cycle of the fuel delivery means is further set to a value determined by the relationship $INT((\dot{\alpha}*1/R*K)+K_1)$ where INT is a microprocessor program operation which produces an integer value from the quantity enclosed in parentheses, where $\dot{\alpha}$ is the change in commanded system performance, where 1/R is the reciprocal of the transmission ratio of the continuously variable ratio transmission and where K is a first predetermined constant and $K_1$ is a second predetermined constant.

6. The system of claim 1 wherein said engine is an internal combustion engine.

7. The system of claim 6 wherein said fuel delivery means comprises a throttle.

8. The system of claim 6 wherein said fuel delivery means comprises a fuel injector.

9. The system of claim 1 wherein said fuel cutting means further comprises speed comparing means for comparing the speed of said engine with a predetermined minimum speed, wherein said fuel cutting means cuts the flow of fuel only when the speed of said engine is above said predetermined minimum speed.

10. The system of claim 1 wherein said fuel cutting means further comprises torque comparing means for comparing the torque of said engine with a predetermined minimum torque, wherein said fuel cutting means cuts the flow of fuel only when the torque of said engine is above said predetermined minimum torque.

11. The system of claim 1 wherein said fuel cutting means further comprises carburetor throttle angle comparing means for comparing the throttle angle of said engine with a predetermined minimum throttle angle, wherein said fuel cutting means cuts the flow of fuel only when the throttle angle of said engine is above said predetermined minimum throttle angle.

12. The system of claim 1 wherein said fuel cutting means further comprises intake manifold pressure comparing means for comparing the intake manifold pressure of said transmission with a predetermined minimum intake manifold pressure, wherein said fuel cutting means cuts the flow of fuel only when the intake manifold pressure of said engine is below said predetermined minimum intake manifold pressure.

13. The system of claim 1 wherein the duty cycle of said fuel delivery means is set to discrete levels which are inversely proportional to the change in commanded system performance.

14. The system of claim 1 wherein the duty cycle of said fuel delivery means changes in an inverse linear relationship to the change in commanded system performance.

15. The system of claim 13 wherein the duty cycle of said fuel delivery means is inversely related to the torque of said engine.

16. The system of claim 14 wherein the duty cycle of said fuel delivery means is inversely related to the torque of said engine.

17. A method of controlling the operation of the engine of an engine-driven vehicle having fuel delivery means for delivering a variable quantity of fuel thereto, said engine coupled to a continuously variable drive ratio transmission for delivering power from said engine to an output shaft, said vehicle having command means for commanding a desired output power or torque delivered to said output shaft, the drive ratio of said transmission varying as a function of commanded power or torque to thereby cause the speed of said engine to vary, the method comprising the steps of:

predetermining a fuel function defining the desired fuel requirement for said engine in relation to engine operating speeds;

measuring the speed of said engine;

controlling said fuel delivery means only in accordance with said fuel function so that the fuel delivered to said engine is determined only by the speed thereof;

operatively coupling said command means to said fuel delivery means during stationary and relatively slow vehicle operation; and executing a microprocessor controlled algorithm for cutting fuel flow to said fuel delivery means, separate from the step of controlling said fuel delivery means in accordance with said fuel function and for cutting fuel flow below that required by said function, when the power or torque commanded by said command means is reduced, wherein said fuel flow is cut by an amount proportional to the rate at which the commanded power or torque is reduced by:

inputting to the microprocessor first and second system performance commands;

the microprocessor processing said first and second system performance commands to arrive at a change in commanded system performance; and controlling the fuel flow to the fuel delivery means at a duty cycle which is inversely proportional to the change in commanded system performance.

18. The method of claim 17 wherein the step of cutting fuel flow when commanded power or torque is reduced further comprises the step of setting the duty cycle of the fuel delivery means to a selected one of a plurality of predetermined discrete values dependent upon the change in commanded system performance.

19. The method of claim 18 wherein the step of cutting fuel flow when commanded power or torque is reduced further comprises the step of setting the duty cycle of the fuel delivery means to a value determined by the relationship $INT((j*1/R*K)+K_1)$ where INT is a microprocessor program operation which produces an integer value from the quantity enclosed in parentheses, where j is said selected one of a plurality of predetermined discrete values, where 1/R is the reciprocal of the transmission ratio of the continuously variable ratio transmission, and where K is a first predetermined constant and $K_1$ is a second predetermined constant.

20. The method of claim 17 wherein the step of cutting fuel flow when commanded power or torque is reduced further comprises the step of setting the duty cycle of the fuel delivery means to a value determined by the relationship $INT((\dot{\alpha}*K)+K_1)$ where INT is a microprocessor program operation which produces an integer value from the quantity enclosed in parentheses, where $\dot{\alpha}$ is the change in commanded system performance and where K is a first predetermined constant and $K_1$ is a second predetermined constant.

21. The method of claim 17 wherein the step of cutting fuel flow when commanded power or torque is reduced further comprises the step of setting the duty cycle of the fuel delivery means to a value predetermined by the relationship $INT((\alpha*1/R*K)+K_1)$ where INT is a microprocessor program operation which produces an integer value from the quantity enclosed in parentheses, where $\alpha$ is the change in commanded system performance, where 1/R is the reciprocal of the transmission ratio of the continuously variable ratio transmission, and where K is a first predetermined constant and $K_1$ is a second predetermined constant.

* * * * *